(12) United States Patent
Röhl et al.

(10) Patent No.: US 8,436,711 B2
(45) Date of Patent: May 7, 2013

(54) INTEGRATED GAS DISCHARGE LAMP AND IGNITION TRANSFORMER FOR AN INTEGRATED GAS DISCHARGE LAMP

(75) Inventors: Manfred Röhl, Bruckmühl (DE); Bernhard Siessegger, München (DE)

(73) Assignee: OSRAM Gesellschaft mit beschrankter Haftung, Munich (DE)

( * ) Notice: Subject to any disclaimer, the term of this patent is extended or adjusted under 35 U.S.C. 154(b) by 15 days.

(21) Appl. No.: 13/132,074

(22) PCT Filed: Nov. 18, 2009

(86) PCT No.: PCT/EP2009/065358
§ 371 (c)(1),
(2), (4) Date: May 31, 2011

(87) PCT Pub. No.: WO2010/060837
PCT Pub. Date: Jun. 3, 2010

(65) Prior Publication Data
US 2011/0234356 A1      Sep. 29, 2011

(30) Foreign Application Priority Data

Nov. 28, 2008   (DE) .......................... 10 2008 059 545
Nov. 28, 2008   (DE) .......................... 10 2008 059 561

(51) Int. Cl.
*H01F 17/04*   (2006.01)
*H01F 27/29*   (2006.01)
*H01J 7/44*    (2006.01)
*H01J 1/50*    (2006.01)

(52) U.S. Cl.
USPC .............. 336/221; 336/192; 315/57; 313/153

(58) Field of Classification Search .................. 336/192, 336/222, 223, 232, 221; 123/634; 313/491, 313/492, 493, 153, 157, 158, 159, 161; 315/57, 315/248, 276

See application file for complete search history.

(56) References Cited

U.S. PATENT DOCUMENTS

| 3,496,504 A | 2/1970 | Daley |
| 3,826,967 A | 7/1974 | Wilkinson et al. |
| 4,134,044 A * | 1/1979 | Holmes .................... 315/209 R |
| 4,163,437 A | 8/1979 | Notaras et al. |

(Continued)

FOREIGN PATENT DOCUMENTS

| DE | 199 13 942 | 4/2000 |
| DE | 103 17 945 | 11/2003 |

(Continued)

*Primary Examiner* — Mohamad Musleh
*Assistant Examiner* — Joselito Baisa
(74) *Attorney, Agent, or Firm* — Cozen O'Connor

(57) ABSTRACT

An ignition transformer (80) for generating an ignition voltage for a high-pressure gas discharge lamp (5) which has a high-pressure gas discharge lamp burner (50), comprising a ferrite core (81) and at least one primary winding (86) and at least one secondary winding (87), the at least one secondary winding (87) being formed from an insulated metal strip that is disposed on the ferrite core (81) in such a way that the end of the at least one secondary winding (87) that carries the high-voltage is disposed on the inside, wherein the ferrite core has the form of a film reel, and the secondary winding (87) is wound onto the ferrite core like a film.

19 Claims, 27 Drawing Sheets

U.S. PATENT DOCUMENTS

| | | | |
|---|---|---|---|
| 4,761,628 A * | 8/1988 | Nishi et al. | 336/180 |
| 5,748,064 A * | 5/1998 | Smeenge et al. | 336/83 |
| 6,049,163 A * | 4/2000 | Masuda et al. | 313/318.12 |
| 6,084,354 A * | 7/2000 | Kohmura et al. | 315/57 |
| 6,429,591 B1 * | 8/2002 | Takamatsu et al. | 315/56 |
| 6,624,596 B1 * | 9/2003 | Ohsawa et al. | 315/276 |
| 6,919,687 B2 * | 7/2005 | Kika | 315/57 |
| 6,933,821 B2 * | 8/2005 | Fushimi | 336/83 |
| 7,042,169 B2 * | 5/2006 | Neumeier et al. | 315/289 |
| 7,209,022 B2 * | 4/2007 | Kuroiwa et al. | 336/83 |
| 7,477,122 B2 * | 1/2009 | Iguchi et al. | 336/192 |
| 7,701,317 B2 * | 4/2010 | Sullivan et al. | 336/178 |
| 7,728,500 B2 * | 6/2010 | Ogasawara et al. | 313/492 |
| 7,999,651 B2 * | 8/2011 | Yamada et al. | 336/208 |
| 2010/0085139 A1 * | 4/2010 | Yan et al. | 336/221 |

FOREIGN PATENT DOCUMENTS

| | | |
|---|---|---|
| DE | 10 2004 044 368 | 3/2006 |
| EP | 0 886 286 | 12/1998 |
| EP | 1 635 619 | 3/2006 |
| WO | WO 2007/087818 | 8/2007 |

* cited by examiner

INTEGRATED GAS DISCHARGE LAMP AND IGNITION TRANSFORMER FOR AN INTEGRATED GAS DISCHARGE LAMP

RELATED APPLICATIONS

This is a U.S. National Stage of application No. PCT/EP2009/065358, filed on Nov. 18, 2008.

This application claims the priority of German application no. 10 2008 059 545.4 filed Nov. 28, 2008 and 10 2008 059 561.6 filed Nov. 28, 2008, the entire content of both of which are hereby incorporated by reference.

FIELD OF THE INVENTION

The invention relates to an integrated gas discharge lamp and an ignition transformer for an integrated gas discharge lamp for generating an ignition voltage, comprising a ferrite core and at least one primary winding and at least one secondary winding, wherein the at least one secondary winding is formed from an insulated metal strip that is disposed on the ferrite core in such a way that the end of the at least one secondary winding carrying the high voltage is disposed on the inside.

BACKGROUND OF THE INVENTION

DE 199 13 942 C1 discloses an integrated gas discharge lamp which comprises an integrated ignition device with a toroidal core transformer. The toroidal core transformer is spooled with a secondary winding and then spooled with a primary winding. Since the primary winding, in order to achieve a good coupling of the transformer, covers a large area of the secondary winding, the insulation of the wire of the primary winding must be designed in such a way that it can insulate the entire ignition voltage generated by the secondary winding. However, this is involved and expensive since there are no constructional measures for insulating the voltage, but the insulation of the wire must accomplish precisely this.

DE 10 2004 044 368 A1 discloses an improved ignition transformer, of which the ferrite has a cup core shape and the secondary winding consists of a metal strip. However, this transformer is complex to produce since the secondary winding cannot be wound on the ferrite, but instead has to be wound on a mandrel and can only be inserted into the cup-core-shaped ferrite as a finished coil. Owing to the manufacturing tolerances, the coil space available in this instance is not well utilized and the coupling also is not optimal.

SUMMARY OF THE INVENTION

One object of the invention is to provide an improved ignition transformer for an integrated gas discharge lamp for generating an ignition voltage, which ignition transformer comprises a ferrite core and at least one primary winding and at least one secondary winding, the at least one secondary winding being formed from an insulated metal strip which is disposed on the ferrite core in such a way that the end of the at least one secondary winding carrying the high voltage is disposed on the inside.

EMBODIMENT OF THE INVENTION

This and other objects are attained in accordance with one aspect of the present invention directed to an ignition transformer for generating an ignition voltage for a gas discharge lamp, said ignition transformer comprising a ferrite core and at least one primary winding and at least one secondary winding, the at least one secondary winding being formed from an insulated metal strip which is disposed on the ferrite core in such a way that the end of the at least one secondary winding carrying the high voltage is disposed on the inside, wherein the ferrite core has the form of a film reel and the secondary winding is wound onto the ferrite core like a film. This ensures a simple a cost-effective production of the ignition transformer.

With regard to the integrated gas discharge lamp the problem is solved in accordance with the invention using an integrated gas discharge lamp which contains an ignition transformer according to the invention.

If the ferrite core comprises two essentially parallel side walls and a central core, the outer contour of the side walls being round or essentially square, the secondary winding can be wound directly onto the ferrite core.

The ferrite core includes two ferrite core halves which, when assembled, adopt the form of a film reel, the central core of the ferrite core being hollow cylindrical and having two halves, and each ferrite core half having a side wall and a central core half. With this arrangement the inside end of the secondary winding can be pinched between the central core halves, which simplifies the winding of the secondary winding. However, the ferrite core may also have three parts which, when laid centrally one above the other, adopt the form of a film reel, two of the three parts being essentially identical and the two side walls forming the film reel and the third part having a hollow cylindrical form which forms the central core of the film reel, the hollow cylindrical third part comprising a slit in the longitudinal direction. The secondary winding is thus enclosed more tightly by the ferrite core, which improves the coupling of the ignition transformer.

If the ignition transformer comprises a contact body which is disposed within the hollow cylindrical region of the ferrite core, the start of the metal strip of the secondary winding can be guided inwardly between the two core halves or through the slit in the hollow cylindrical third part, where it can then be electrically connected to the contact body. The contact body is in turn electrically connectable to a power supply of the high-pressure discharge lamp burner. This ensures an efficient and short connection of the ignition transformer to the gas discharge lamp burner.

The contact body preferably includes a curved sheet metal part, the curved sheet metal part consisting of a essentially rectangular area, which is curved together in a cylindrical manner, and two laterally protruding tabs which are mutually opposed in the curved state and are inclined to one another in the manner of two roof faces, and at the end at which the two roof faces meet are shaped in such a way that a power supply wire of the high-pressure discharge lamp electrode is clamped in a centered manner. This makes the contacting of the power supply wire of the gas discharge lamp burner particularly simple.

If the ignition transformer comprises a primary winding with at least one turn which is designed as a strip-like, resilient, stamped bent part, in such a way that the secondary winding is secured by the resilience of the primary winding, and the outer end of the secondary winding is electrically connected to the primary winding, the ignition transformer can be produced more simply and can be handled more easily.

If the stamped bent part of the primary winding is round or angular, wherein in the case of the angular shaping it comprises at the corners of the stamped bent part cylindrical, inwardly pointing rounded portions in which yoke ferrites are fixed, the ignition transformer is particularly compact and, in the case of a rectangular shaping, can be provided with a closed magnetic yoke.

The stamped bent part of the primary winding particularly preferably comprises at least two spiraled windings arranged one on top of the other. This improves the current flow in the primary circuit at the moment of ignition.

If the stamped bent part of the primary winding comprises laterally integrally molded first tabs which mechanically fasten the ignition transformer, the ignition transformer can thus be fastened on a printed circuit board or the like in a simple and secure manner. If the stamped bent part of the primary winding has outwardly pointing rounded portions at either end for relieving the mechanical load of second tabs which are laterally integrally molded on the respective end and in turn electrically contact an ignition electronics system, the solder connection of the electrical contact is treated with care. The soldered connection can no longer break, in particular when there are large fluctuations in temperature.

The ignition transformer is preferably soaked with a suitable means, in particular with an impregnating varnish, or cast with a casting compound in order to increase the mechanical stability and the strength of electrical insulation.

If the side walls of the ignition transformer comprise elongated recesses extending from the outside in on the side facing the winding, the soaking or casting process is considerably facilitated. This results in an improved penetration of the impregnating varnish or casting compound.

The ratio of diameter to height of the ferrite core is preferably greater than 1 and less than 9, in particular greater than 1.5 and less than 5. The ignition transformer thus remains compact and achieves a high level of electrical efficiency.

Further advantageous developments and configurations of the integrated gas discharge lamp according to the invention and of the ignition transformer according to the invention will emerge from the further dependent claims and from the following description.

BRIEF DESCRIPTION OF THE DRAWING(S)

Further advantages, features and details of the invention will emerge on the basis of the following description of embodiments and on the basis of the drawings, in which like or functionally similar elements are denoted by like reference numerals, wherein.

DETAILED DESCRIPTION OF THE DRAWINGS

Mechanical Integration

Figure 1:
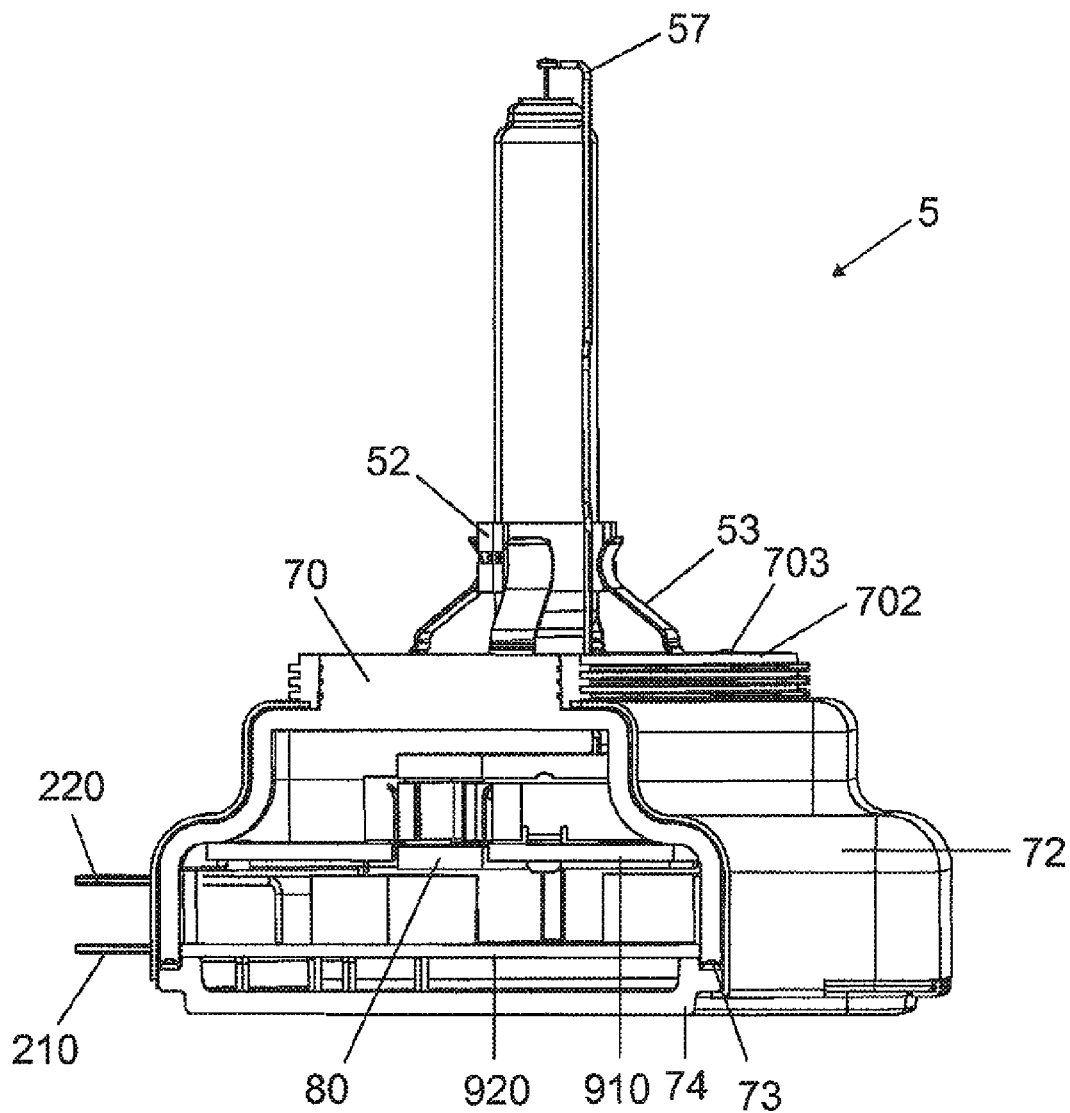
FIG. 1 shows a sectional view of a first embodiment of an integrated gas discharge lamp according to the invention.

FIG. 1 shows a sectional view of a first embodiment of the integrated gas discharge lamp 5. Hereinafter, a gas discharge lamp 5 which has both the ignition electronics system and the operating electronics system integrated in the lamp base will be referred to as an integrated gas discharge lamp 5. Externally the integrated gas discharge lamp 5 therefore no longer comprises any specific lamp interface, but can be connected directly to generally conventional and widespread electric mains. In one configuration as a car headlamp the interface of the integrated gas discharge lamp 5 is thus the conventional 12 V supply of the car's on-board supply system. In a further configuration as a car light the interface of the integrated gas discharge lamp 5 can also be a prospective 42 V supply of a modern on-board supply system in a car. However the integrated gas discharge lamp 5 can also be designed to be connected to the high-voltage on-board supply system of an electric car with a battery voltage of, for example, 48 V, 96 V, or 120 V up to 360 V for example. The integrated gas discharge lamp can further be designed to operate on an emergency power supply with a battery-backed low-voltage power network. This lamp can also be used in low-voltage isolated networks, for example as are used in mountain shelters. It is also conceivable to use conventional low-voltage systems in which low-voltage halogen lamps were previously used. Such a lamp is even advantageous in portable devices such as torches, since no wiring between the lamp and the operating device is necessary. Since there is no cable there are also no additional costs, wiring outlay and unnecessary fault sources. Hereinafter an integrated gas discharge lamp 5 is thus understood to mean a gas discharge lamp which has all the electronics required for operation integrated into the lamp itself, in such a way that it can be connected directly to a conventional mains power supply.

A lamp burner 50 is mounted by a metal clip 52 which is attached to four retaining plates 53. The retaining plates 53 are cast or injection-molded into a lamp base 70. The lamp base 70 preferably consists of plastics material and is produced by an injection molding or casting method. In order to improve the electrical shielding, the plastics material of the lamp base 70 can be electrically conductive or metalized. It is particularly advantageous if the lamp base is metalized on the outer face and therefore on the face remote from the ignition and operating electronics systems 910, 920. In addition to metallization, it is also possible to insert-mould metal conductors or a metal braiding, in such a way that an electrically conducting skin is formed in the wall of the lamp base 70. If no conductive or metalized plastics material is used then the plastics material base is surrounded by an electrically conductive housing 72 made of a conductive material, such as metal. For example, the metal can be a sheet iron which is protected against corrosion, or else even a nonferrous heavy metal such as aluminum, magnesium or brass. A ring seal 71, commonly also referred to as an O-ring, sits on the burner-side termination of the electrically conductive housing 72 and provides a seal relative to the reflector. As a result of this measure it is possible to construct a tight headlamp system without having to integrate the lamp completely into a sealed headlamp. Since the lamp sits externally on the headlamp, the cooling of ignition and operating electronics systems 910, 920 in the base is considerably improved and simpler than with a conventional construction, in which the gas discharge lamp 5 is incorporated into a tight headlamp, wherein only a weak cooling convection is possible. The surrounding air inside the described, tight headlamp causes a 'heat build-up' which leads to considerably higher temperatures of the operating electronics system than in the proposed embodiment in which the lamp is arranged in the open on the side remote from the illuminating surface, for example in the engine compartment.

The base 70 is sealed by a base plate 74 on the side remote from the lamp burner 50. The base plate 74 preferably consists of an effective heat and electrically conductive material, such as aluminum or magnesium. In order to produce a mechanical connection to the base 70 and an electrical connection to the electrically conductive housing 72, said housing comprises a plurality of tabs 722 on the side remote from the lamp burner 50, which tabs are beaded onto the base plate 74 during assembly of the integrated gas discharge lamp 5 and thus produce the required connections. Inter alia, the lamp burner 50, ignition electronics system 910 and operating electronics system 920 are inseparably connected to one another by this type of connection method to form an integrated gas discharge lamp 5. This affords the advantage for the motor vehicle manufacturer that, in contrast to conventional systems which consist of an operating device and a gas discharge lamp, the integrated gas discharge lamp 5 is still only one part in terms of logistics and assembly, the lesser complexity leads to reduced costs, and a risk of confusion between components having the same purpose but a different design, for example different product versions of the operating devices, is eliminated. For the end customer, for example the vehicle purchaser, this affords the advantage that the reduced complexity of the replacement of a faulty integrated gas discharge lamp compared to the prior art is considerably facilitated and accelerated, fault finding is made easier and less knowledge and skill are required in order to change a lamp. The omission of the cable and plug connector between the components also reduces costs, increases reliability and reduces weight.

The base plate is preferably made of an aluminum pressure die casting or a magnesium pressure die casting. This also constitutes a cost-effective and mechanically and electrically high-quality variation. An effective electrically conductive connection between the at least one lamp base 70, which is electrically conductive over the surface, or the electrically conductive housing 72 and the likewise electrically conductive base plate 74 is necessary, in particular, for good electromagnetic shielding. This shielding reduces the interference of adjacent electric or electronic modules. Furthermore, the shielding ensures that the modules have no negative effect on the function of the ignition and operating electronics systems 910, 920. A ring seal 73 is arranged between the base plate 74 and the base 70 which ensures a watertight and airtight connection between the base 70 and the base plate 74. In an alternative embodiment the base 70 and the base plate 74 are designed in such a way that the two parts can be engaged with one another and, in the engaged position, one or more contact points exist simultaneously between the electrically conductive housing 72 and the base plate 74 in order to generate a good connection for the electric shielding. In this case, too, a ring seal is again arranged between the base and base plate, which ring seal ensures the tightness of the base on the side remote from the gas discharge lamp burner 50. Two planes are provided inside the base 70 which accommodate the ignition and operating electronics systems. A first, smaller plane, which lies closest to the lamp burner 50, accommodates the ignition electronics system 910 comprising the ignition transformer 80. The construction of the ignition transformer 80 will be discussed later. A second, larger plane accommodates the operating electronics system 920 necessary for the operation of the discharge lamp burner 50. The ignition and operating electronics systems can be located on any suitable type of circuit board, also called printed circuit boards. Conventional printed circuit boards, metal core printed circuit boards, printed circuit boards with LTCC technology, oxidized or coated metal plates with strip conductors with thick film technology, plastics material printed circuit boards with MID technology or MID hot stamping technology or suitable further possible technologies for the production of heat-resistant printed circuit boards are considered. The electronic components and component parts which form the ignition and operating electronics systems can each be located on the upper side and underside of the two printed circuit boards as well as inside the two printed circuit boards. Apart from the transformer 80, FIG. 1 shows no further electronic components or component parts on the printed circuit board for the sake of clarity. If the printed circuit board for the ignition electronics system 910 and the printed circuit board for the operating electronics system 920 are made of the same material, they can advantageously be manufactured for the same purpose. Bridges can be fitted between the printed circuit boards, which bridges act as electrical connections between the printed circuit boards during separation and insertion into the lamp base 70. For example, individual wires, ribbon cables or rigid-flexible printed circuit boards can be used as bridges. The electrical connection between the two printed circuit boards is designed in such a way that it survives a change in distance between the two printed circuit boards of the ignition and operating electronics systems owing to thermal expansion, in particular owing to a thermal cycle loading, without being damaged. For this purpose for example, the wires are to be provided with sufficient length and are to be laid accordingly within the housing. Alternatively for example, one or more male and female headers can be used which are sized and arranged in such a way that they allow thermal expansion, in the direction of the longitudinal axis of the gas discharge lamp burner, of the two printed circuit boards and still ensure an electrical connection in all cases. For this purpose for example, the pins of the male header are arranged perpendicular to the respective printed circuit board surface and the insertion length of the sockets is dimensioned in such a way that they provide more space for the pins than is required inside the sockets owing to thermal expansion.

The printed circuit board for the ignition electronics system 910 comprises an electrically conductive shielding face on the side facing the operating electronics system in order to keep interference, which is generated by the high voltage in the ignition electronics system, as far away as possible from the operating electronics system. In the case of a metal or metal core printed circuit board, this face is provided inherently, whereas with other printed circuit board materials a copper face or the like is preferably attached on this side. If a metal core printed circuit board is used then the ignition transformer 80 can also be cooled with this, said ignition transformer being subjected to particularly high temperatures owing to the proximity to the gas discharge lamp burner 50. An electrically conductive shielding face between the ignition electronics system 910 and the operating electronics system 920 can alternatively also be formed by a metal sheet which is inserted between the two printed circuit boards and is advantageously connected to the electrically conductive housing 72 in an electrically conductive manner. If this shielding face is also to be used to cool the ignition transformer 80, it is advantageous if the metal sheet also has a good thermal connection to the electrically conductive housing 72, for example owing to a heat conducting film or heat conducting paste.

The printed circuit board for the operating electronics system 920 is clamped between the base 70 and the base plate 74. Over its periphery the printed circuit board for the operating electronics system 920 has a peripheral ground strip conductor ('ground ring') on each of the upper side and underside, said ground rings being connected to one another in an electrically conductive manner by plated through-holes. These plated through-holes are normally referred to as vias and are electrical contacts which extend through the printed circuit board. These ground rings produce an electrical contact to the base plate 74 as a result of the clamping between the base 70 and the base plate 74, whereby the ground connection between the operating electronics system 920 and the electrically conductive housing 72 is ensured via the beaded tabs 722.

Figure 2:
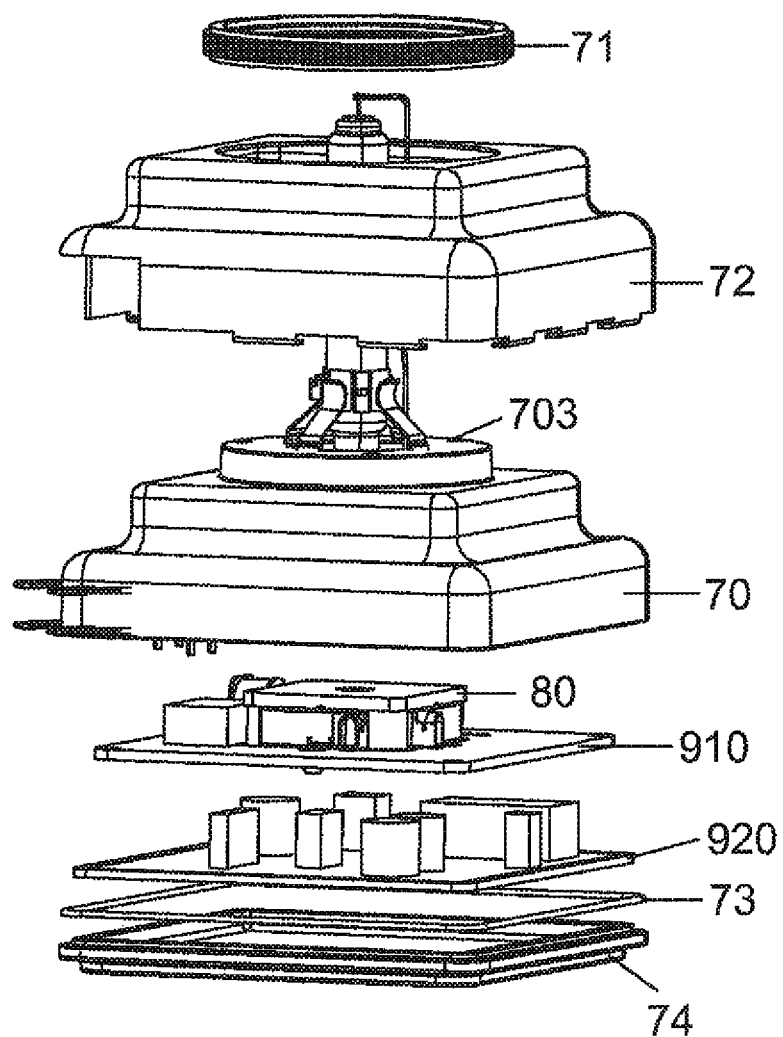
FIG. 2 shows an exploded view of the first embodiment of the mechanical components of the integrated gas discharge lamp.

FIG. 2 shows a first embodiment of an exploded view of the mechanical components of the integrated gas discharge lamp 5. In this case the base is square, although in principle it can also have a multiplicity of other suitable forms. Particularly favorable further embodiments would be round, hexagonal, octagonal or rectangular. In order to determine the outer contour of the embodiment an imaginary cross-section is made through the housing part containing the electronics perpendicular to the longitudinal axis of the gas discharge lamp burner 50 and the resultant outer contour is observed, wherein rounded portions at the housing edges are to be ignored. In the case of the first embodiment shown in FIGS. 1 and 2, two squares emerge depending on whether the selected intersection is arranged closer to the ignition electronics system 910 or closer to the operating electronics system 920. The first embodiment is therefore a square embodiment. The first resultant outer contour in the vicinity of the ignition electronics system 910 is smaller than the second, which is essentially caused by the printed circuit board of the ignition electronics system 920 having smaller dimensions than those of the operating electronics system 910. However, this does not necessarily have to be the case and an embodiment in which the two outer contours are of the same size and there is consequently only one, single outer contour is also possible. The two geometries of the outer contours also do not have to be identical in the different regions. In particular, a small, round outer contour in the region of the ignition electronics system and a larger, hexagonal outer contour in the region of the operating electronics system would appear to be a particularly advantageous embodiment.

As already illustrated above, the printed circuit board for the operating electronics system 920 is clamped between the base 70 and the base plate 74. Similarly to the printed circuit board for the operating electronics system 920, the ring seal 73 comes to lie between the base 70 and the base plate 74 and is arranged outside the printed circuit board for the operating electronics system 920.

Figure 3:
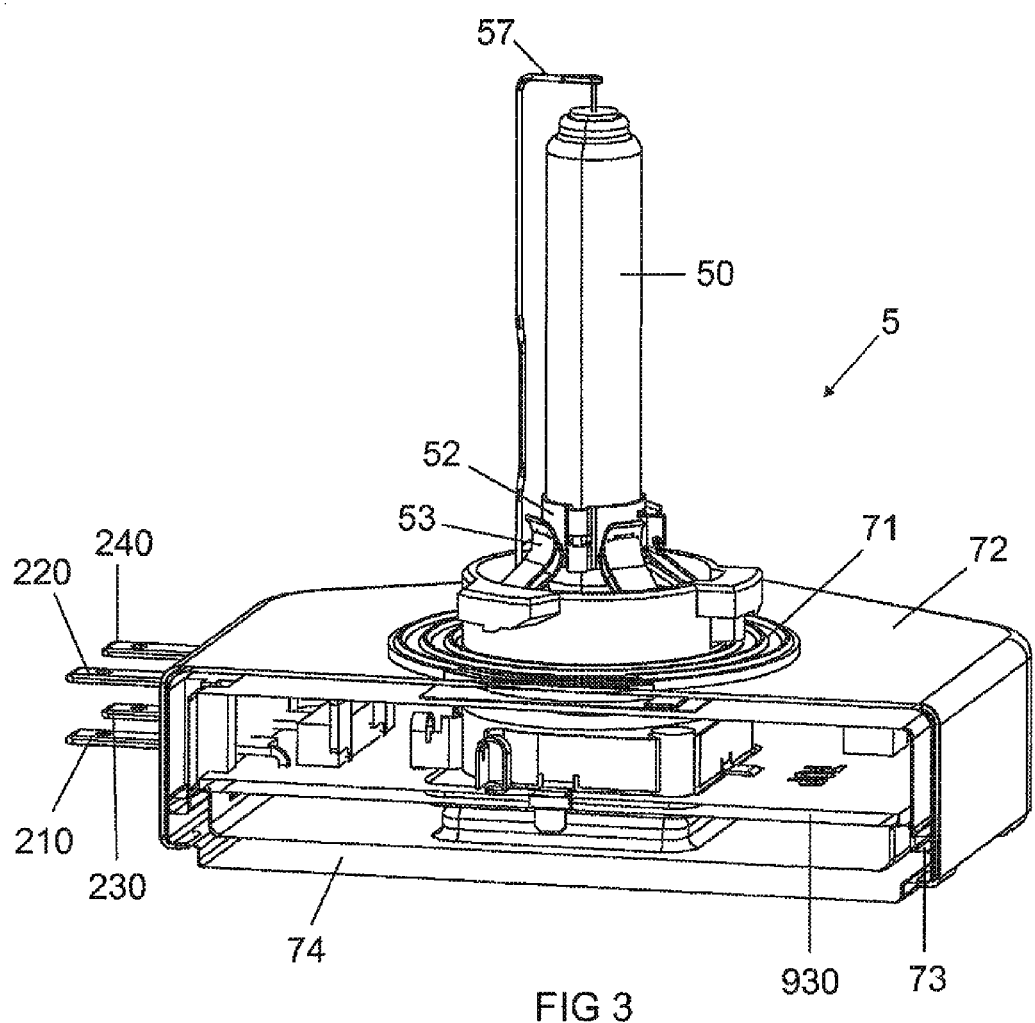
FIG. 3 shows a sectional view of a second embodiment of an integrated gas discharge lamp according to the invention.

FIG. 3 shows a sectional view of a second embodiment of the integrated gas discharge lamp 5. The second embodiment is similar to the first embodiment and so merely the differences to the first embodiment will be described. In the second embodiment the ignition electronics system 910 and the operating electronics system 920 are arranged in a common plane on a printed circuit board as an overall operating electronics system 930. As a result of this measure, the base of the gas discharge lamp 5 according to the invention can be flatter, whereby a headlamp which uses this gas discharge lamp is also less deep. The ignition transformer 80 sits centrally beneath the gas discharge lamp burner 50. The centre point of the ignition transformer 80 preferably lies in the longitudinal axis of the gas discharge lamp burner 50. The power supply for the gas discharge lamp burner electrode close to the base projects into the central part of the ignition transformer. The ignition transformer is not mounted on the printed circuit board, but instead sits with its end remote from the gas discharge lamp burner at approximately the same height as the side of the printed circuit board remote from the gas discharge lamp burner. The printed circuit board of the overall operating electronics system 930 is therefore recessed at this point, in such a way that the ignition transformer 80 is inserted into the printed circuit board of the overall electronics system 930. In order to improve the electromagnetic compatibility, the housing can be provided with walls and chambers, for example by webs made of sheet aluminum or Mu metal, and an electric, magnetic and electromagnetic shielding of different circuit parts from one another and from the surrounding environment can thus be produced. The shielding can also be achieved by other measures, in particular cavities can be formed in the base plate 74 and in the lamp base 70 in a simple manner within the scope of the injection molding method.

The remaining voids inside the housing of the integrated gas discharge lamp 5, in particular around the ignition transformer 80 and on either side of the overall operating electronics system 930, are filled with casting compound. This affords a number of advantages, for example arcing, in particular as a result of the high voltage generated by the ignition transformer, is reliably prevented, a good level of cooling of the electronics is ensured, and a very mechanically robust unit is provided which, in particular, very effectively withstands environmental influences such as moisture and high accelerations. However, a partial casting, for example in the region of the ignition transformer 80, can also be carried out, in particular in order to reduce weight.

Figure 8:
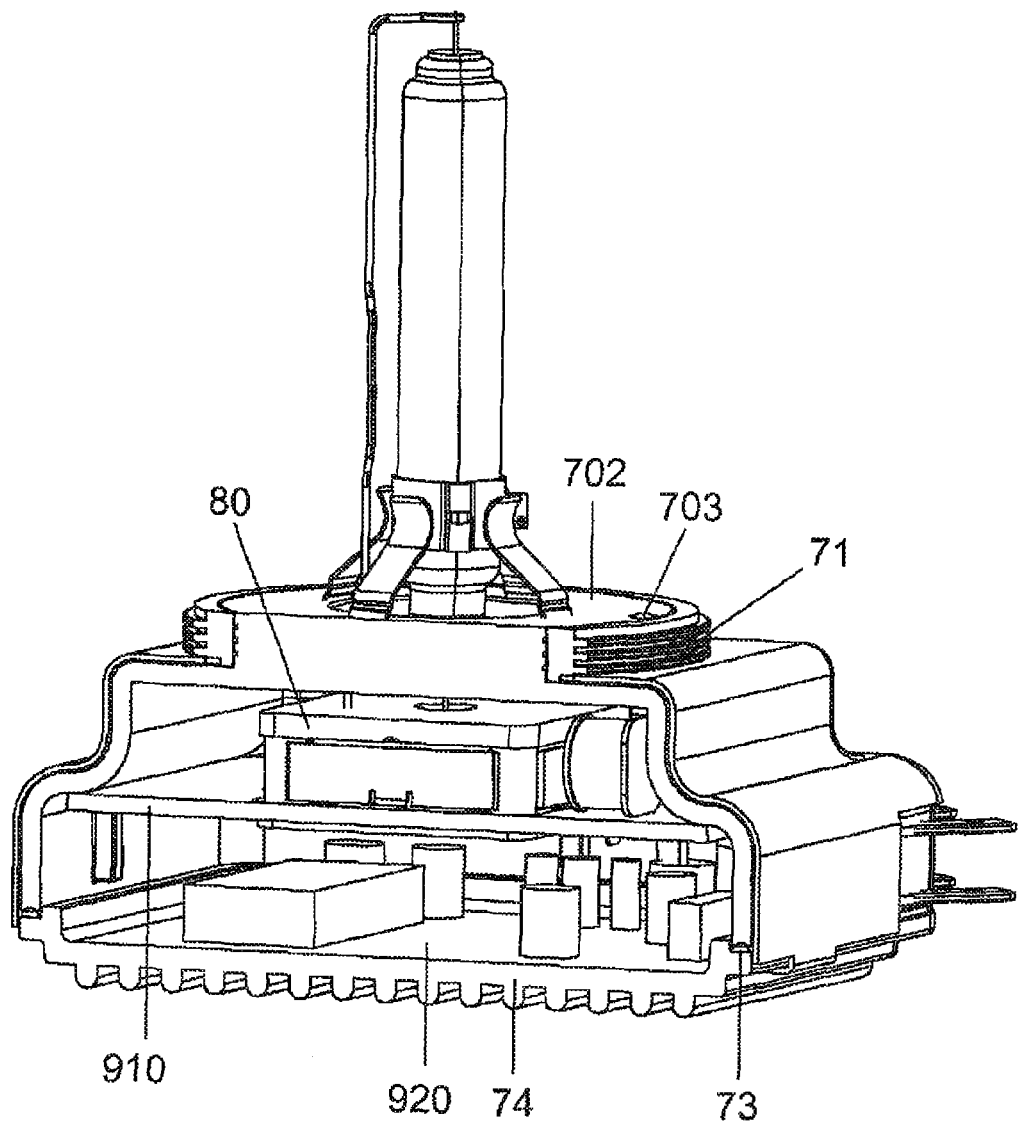
FIG. 8 shows a sectional view of a third embodiment of the integrated gas discharge lamp.

FIG. 8 shows a third embodiment of the integrated gas discharge lamp 5 according to the invention. The third embodiment is similar to the first embodiment and so merely the differences to the first embodiment will be described. In the third embodiment the base plate 74 is provided on its outer face with cooling ribs. It is also conceivable for the lamp base 70 and the electrically conductive housing 72 to also each be provided with cooling ribs. In addition, the function of the printed circuit board of the operating electronics 920 is also fulfilled by the base plate, since this has electrically non-conductive regions on its inner face, for example regions made of anodically oxidized aluminum which are provided with conducting structures, for example strip conductors with thick film technology, and which are connected to the components of the overall operating electronics system in an electrically conductive manner, for example by soldering. As a result of these measures the operating electronics system 920 is cooled particularly efficiently since it is attached directly on a cooling member. The cooling ribs are preferably designed in such a way that a natural convection is favored in the installation position of the integrated gas discharge lamp 5. If the integrated gas discharge lamp 5 is to be operable in different installation positions, the cooling surface can also be designed accordingly and may consist, for example, of round, hexagonal, square or rectangular fingers, in such a way that a natural convection can take place in a plurality of spatial directions. The ignition electronics system 910 is located, as in the first embodiment, on a printed circuit board arranged thereabove and is electrically connected to the operating electronics system 920 by suitable measures. This can be achieved by spring contacts or plug contacts, but also by strip conductors extending in the base or strip conductors impressed on the inner face of the base and connected to the ignition electronics system 910 and the operating electronics system 920.

Figure 9:
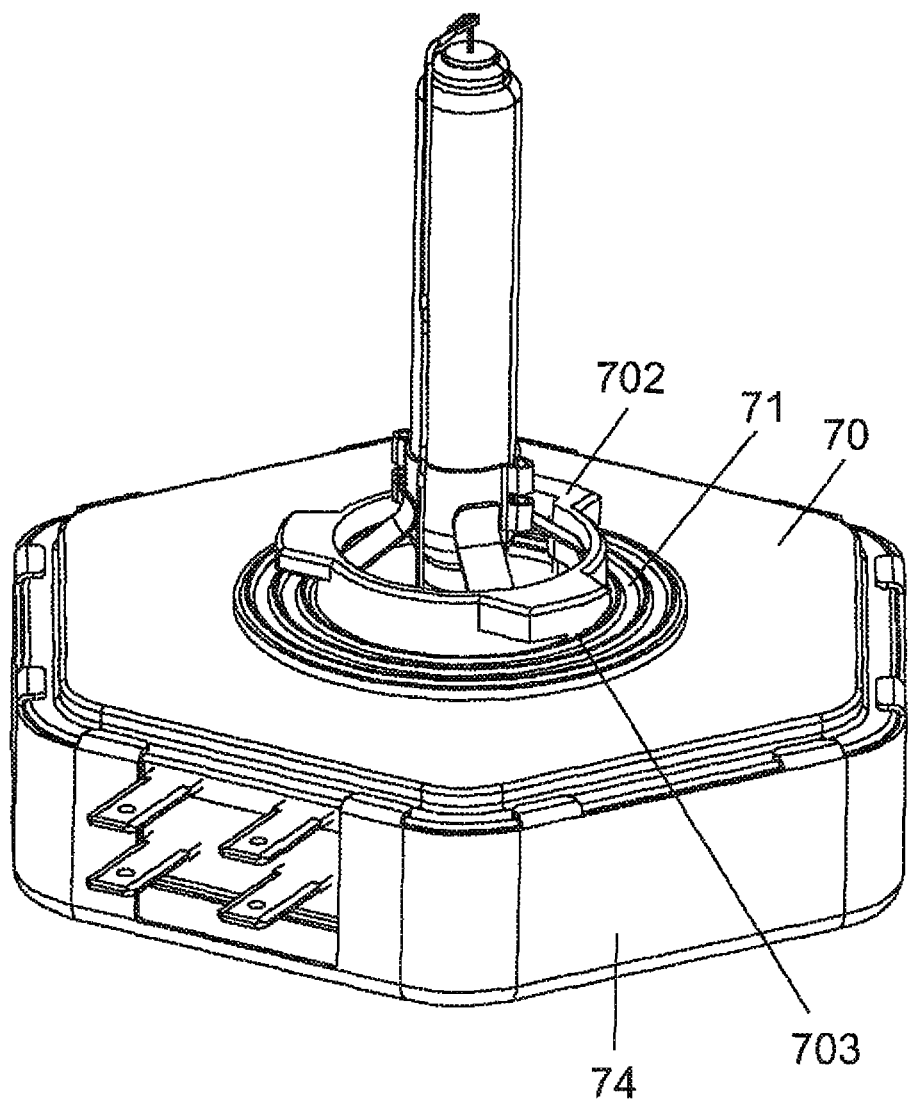
FIG. 9 shows a perspective view of a fourth embodiment of an integrated gas discharge lamp according to the invention.

FIG. 9 shows a fourth embodiment of the integrated gas discharge lamp 5 according to the invention. The fourth embodiment is similar to the second embodiment and so merely the differences to the second embodiment will be described. In the fourth embodiment the base plate 74 is formed by a metal core printed circuit board which is fitted on the inner face and thus, as in the previous embodiment, likewise on one side. However, the base plate 74 is not a plate as in FIG. 4, but is more a base cup with raised side walls. The base plate is therefore referred to hereinafter as a base cup for reasons of clarity. The base cup can also consist of an effective heat conductive material. Metal alloys which can be reshaped effectively, for example by deep drawing, are particularly well suited. An effective heat conducting plastics material which can be shaped by injection molding is also well suited. In this embodiment the base 70 comprising the reference ring 702 and the reference protrusions 703 essentially consists of a hexagonal plate on which the burner is adjusted and fixed within the reference ring. The base cup houses the overall operating electronics system 930, which is arranged on its own printed circuit board or on the inner base of the base cup. Plug contact are attached to the power supplies 56, 57 of the gas discharge lamp burner 50 and engage in corresponding counter-contacts of the base cup when said base cup and base 70 are assembled, and produce a reliable contact.

If the base cup and the base 70 are made of metal, the two parts can be connected by beading, as is the case with a coffee jar or tin can. However, as is shown in FIG. 9, merely a plurality of tabs of the base cup may also be beaded onto the base in order to generate a good mechanical and electrical connection. The known soldering and welding methods can also be used, however, in order to produce the connection.

If the base cup and the base 70 are made of plastics material, the connection can preferably be produced by ultrasonic welding. This results in a reliable and rigid connection which, in the case of a conductive plastics material, also entails a conductive connection. However, the connection may also be provided by corresponding locking catches, for which purpose corresponding catches and recesses are to be provided on the base cup and base 70.

Hereinafter the diameter (D) and the height (h) of the integrated gas discharge lamp 5 will be defined largely independently of the geometry in order to provide a more simple description. The height (h) of the integrated gas discharge lamp is understood to mean the maximum distance between the reference plane, which will be discussed in greater detail further below, and the outer face of the base plate (74) remote from the burner. The diameter (D) is understood to mean the longest gap inside the integrated gas discharge lamp, the gap lying within any plane and said plane extending parallel to the reference plane.

The table below shows some geometrical variables of different configurations of the fourth embodiment of the gas discharge lamp 5 illustrated in FIG. 9:

| Diameter | Length/Height h | Volume | Mass | D/h |
|---|---|---|---|---|
| A. 50 W lamp | | | | |
| 100 | 35 | 275 | 510 | 2.86 |
| B. 35 W lamp | | | | |
| 100 | 25 | 196 | 178 | 4.00 |
| C. 25 W lamp, standard variation | | | | |
| 70 | 25 | 99 | 139 | 2.80 |
| D. 18 W lamp, superflat variation | | | | |
| 100 | 15 | 120 | 168 | 6.67 |
| E. 45 W lamp, coffee jar variation | | | | |
| 40 | 50 | 63 | 52 | 0.80 |
| F. 7 W lamp, for use in torches | | | | |
| 40 | 35 | 44 | 36 | 1.14 |

The electric outputs from 7 W to 50 W of the different configurations shown in the table refer to the nominal electric output of the gas discharge lamp burner. Different geometries and sizes of the gas discharge lamp burner similar in design are used in this instance.

Figure 4:
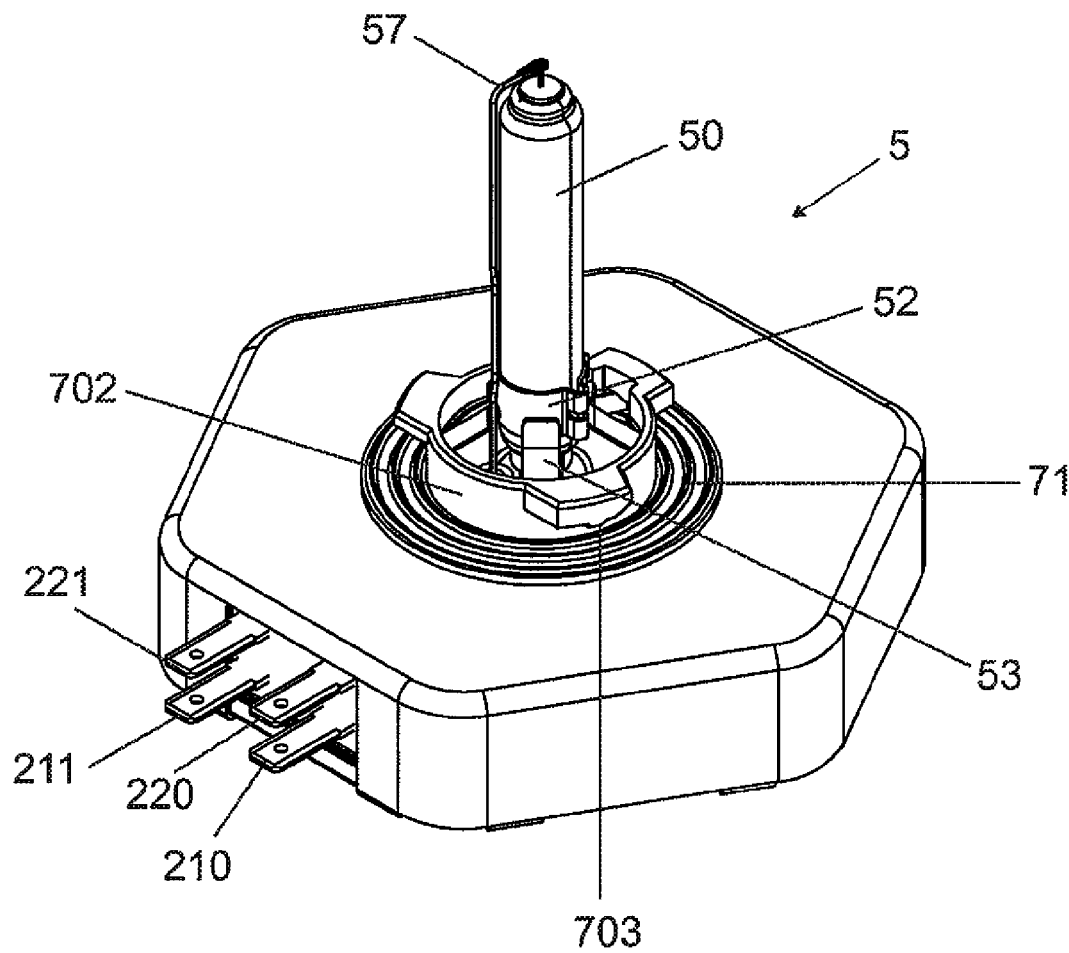
FIG. 4 shows a perspective view of a second embodiment of an integrated gas discharge lamp according to the invention.

As can be seen clearly in FIG. 4, the lamp base of the integrated gas discharge lamp 5 according to the second and fourth embodiment has a hexagonal shape which affords a number of advantages. On the one hand the integrated gas discharge lamp 5 is thus to be gripped effectively in order to be used at its point of destination. On the other hand the use of the printed circuit board of the integrated overall operating electronics system 930 can be designed in such a way that there is only a small amount of waste and a good level of cost efficiency is thus possible. Owing to the flat design of the base, a very short headlamp can be designed which is advantageous, in particular, in modern motor vehicles. In this application the point-symmetrical hexagonal form enjoys all the advantages of a round form, but does not exhibit the drawbacks thereof.

As illustrated in FIGS. 3 and 4, contacts 210, 220 project radially from the base on one side of said base 70 of the lamp towards the longitudinal axis of the gas discharge lamp burner 50. They electrically contact the integrated gas discharge lamp 5 with a headlamp. These contacts are insert-molded during the production of the lamp base 70 within the scope of a plastics material injection molding method. This affords the advantage that no specific plug system is necessary, but the watertight and airtight encapsulation, as was already described above, can still be ensured.

Figure 5:
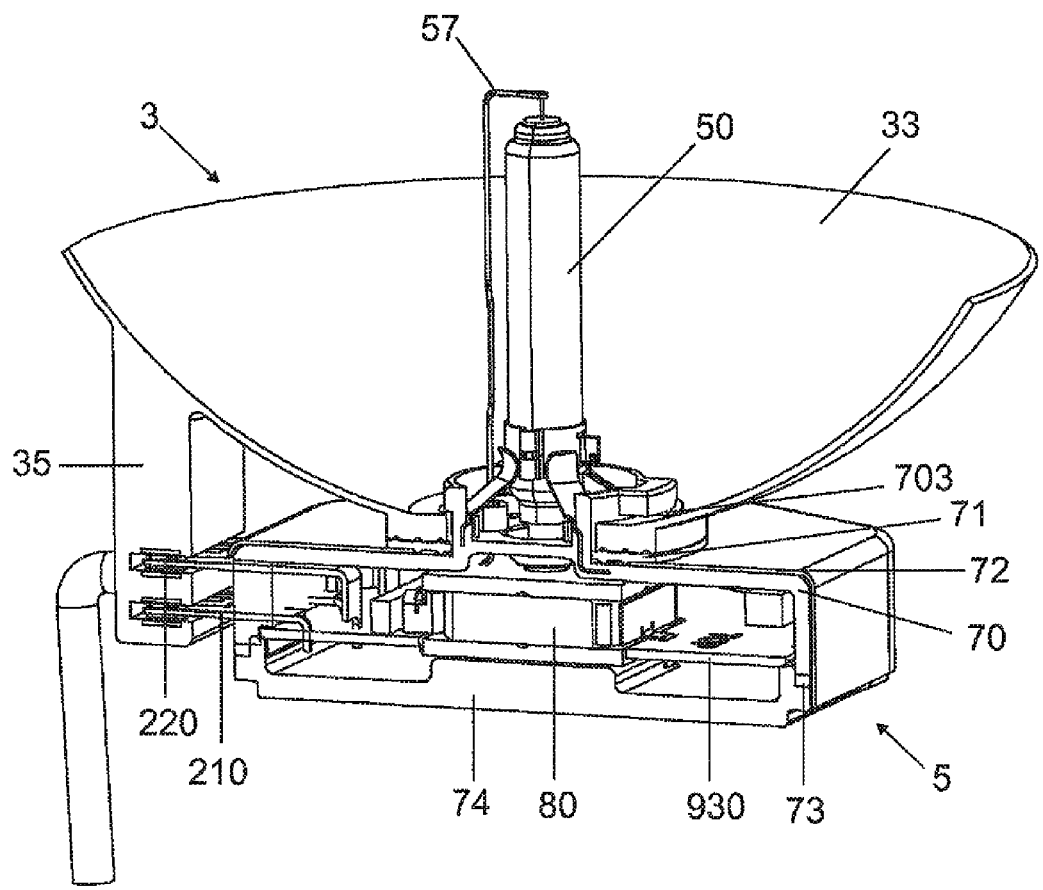
FIG. 5 shows a view of the headlamp/gas discharge lamp interface.
Figure 7:
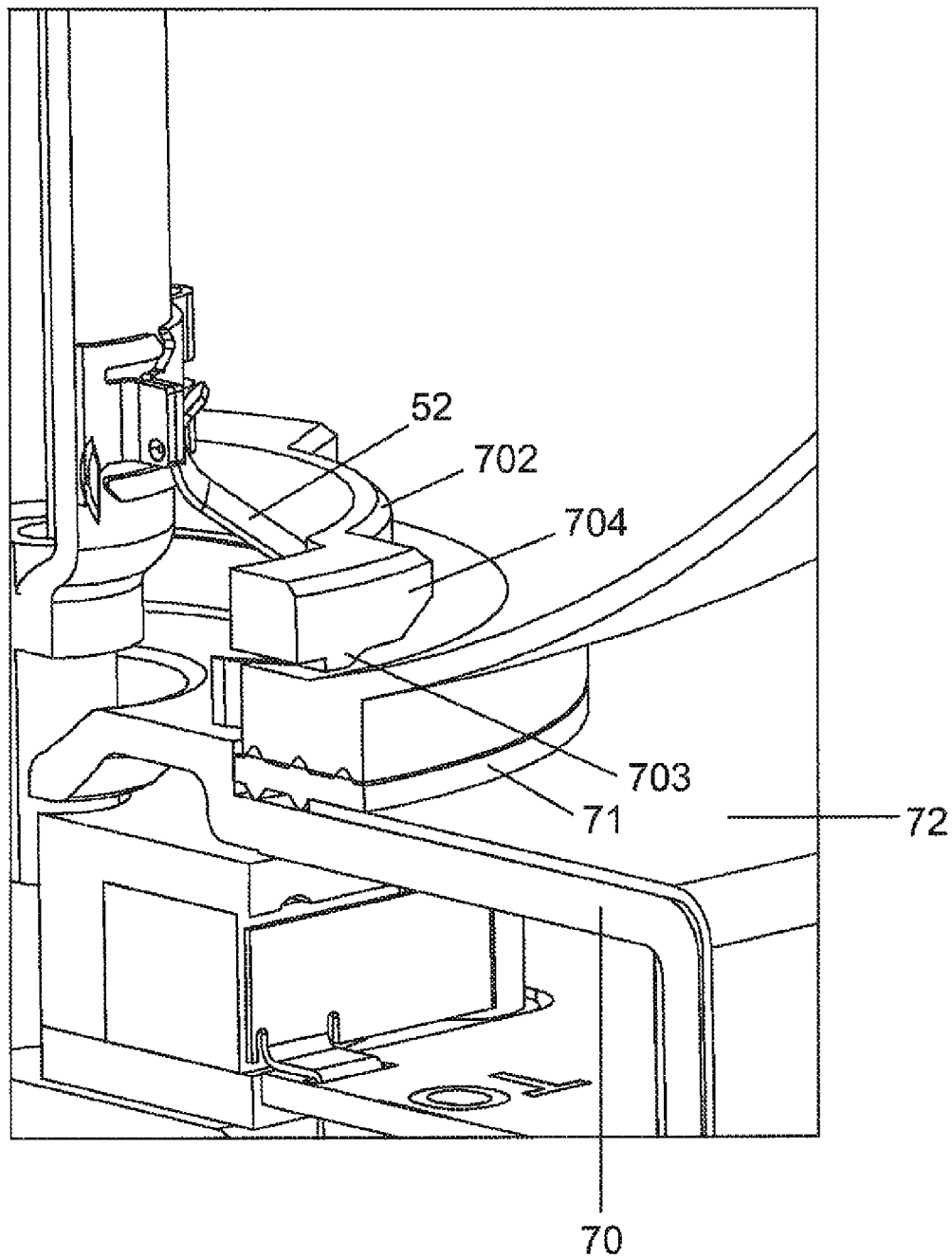
FIG. 7 shows a detail of the mechanical contact.

The cooperation between the integrated gas discharge lamp 5 and headlamp 3 is shown in FIG. 5. The gas discharge lamp 5 in the second embodiment has a specific electrical interface, via which it is supplied with electric power. The electrical interface is designed in such a way that when the gas discharge lamp 5 is inserted into a headlamp 3, it is not only connected mechanically to the headlamp 3 but also electrically at the same time. A similarly constructed interface is also used in modern halogen incandescent lamps for car headlamps and is sold, for example, by Osram under the name "Snap Lite". If the integrated gas discharge lamp 5 is thus used in a reflector or headlamp, all mechanical and electric contacts required for correct operation are connected during the process of insertion to their corresponding counter-contacts provided in the headlamp 3. At its interface to the headlamp 3 the base 70 has protrusions 703 extending out from a reference ring 702 which define a reference plane. A detailed view is shown in FIG. 7. These three protrusions lie on the corresponding counterpiece of the headlamp 3 with insertion of the integrated gas discharge lamp 5. The electrodes and discharge arc of the gas discharge lamp burner 50 are adjusted relative to the reference plane in the manufacturing process of the integrated gas discharge lamp 5. The arc of the integrated gas discharge lamp 5 thus adopts a defined position in the reflector during insertion in the headlamp and this enables precise optical imaging. The insertion into the headlamp is carried out in the second embodiment according to FIGS. 3 and 4 by passing the tabs 704 protruding laterally from the reference ring through the reflector base of a reflector 33 of the headlamp 3. The integrated gas discharge lamp 5 is then rotated relative to the reflector 33, whereupon the protrusions 703, which are attached to the base-side face of the tabs 704, pull the integrated gas discharge lamp inwards and, at the end of the rotation, engage in reference faces on the reflector base provided for this purpose. The ring seal 71 is pressed together and tensions the system in such a way that the protrusions 703 are pressed against the reference faces arranged in the reflector base. The position of the integrated gas discharge lamp 5 and thus of the discharge arc of the gas discharge lamp burner 50 is thus precisely adjusted and fixed relative to the reflector 33. The high repeatability of the mechanical positioning of typically better than 0.1 mm in all three spatial directions of the described headlamp interface makes it possible to produce an optically outstanding headlamp system. Such a headlamp system can be used, in particular, in a motor vehicle, since it is characterized in the corresponding configuration by a pronounced and quite defined light-dark boundary.

Figure 6:
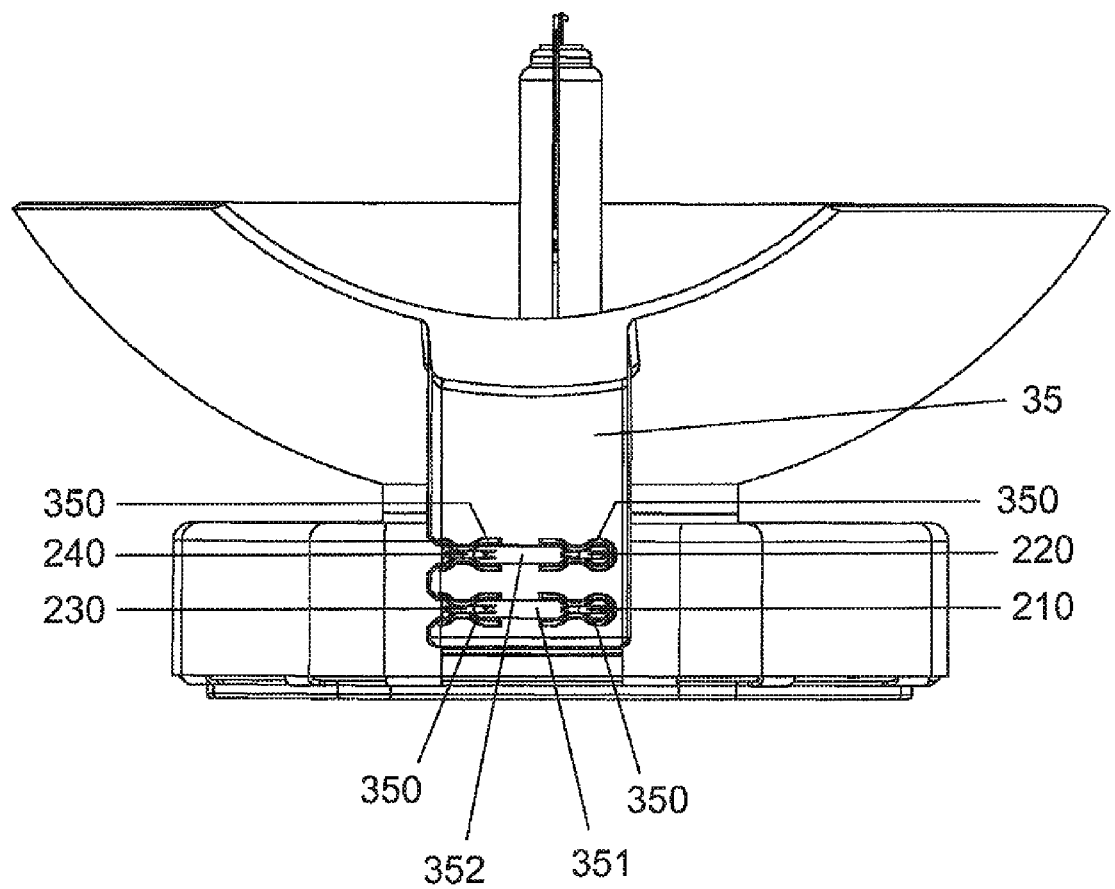
FIG. 6 shows a detail of the electrical contact.

For this purpose a suitable headlamp 3 has a light-directing means in the form of a reflector 33, a socket for the integrated gas discharge lamp 5, and a carrier part 35, wherein a connection element provided with counter-contacts for the electrical contacts 210, 220, 230, 240 of the integrated gas discharge lamp 5 is arranged on the carrier part. The electrical contacts 210, 220, 230, 240 of the integrated gas discharge lamp 5 project radially from the lamp base 70 towards the longitudinal axis of the gas discharge lamp burner 50. They supply the overall operating electronics system 930 with electrical energy. Once the integrated gas discharge lamp 5 has been assembled in the headlamp by an assembly process, which is essentially based on a plug-in movement followed by a clockwise rotational movement, its contacts 210, 220, 230, 240 are arranged in the slits 351, 352 in the connection element 35, as can be seen in the detailed drawing in FIG. 6. These slits 351, 352 are the slits for the electrical counter-contacts 350 to the contacts 210, 220, 230, 240 of the integrated gas discharge lamp 5. The plugs provided with connection cables for contacting the integrated gas discharge lamp 5 in the headlamp according to the prior art are thus omitted. In particular, the electrical contacts of the integrated gas discharge lamp 5 are contacted directly on the carrier part 35 via their counter-contacts 350 of the connection element upon insertion in the headlamp. The mechanical loading of the electric connections is thus reduced by freely swinging cables. The number of connection cables required per headlamp is further reduced and the risk of confusion during manufacture is thus also reduced. In addition, this measure also makes it possible to achieve a relatively higher degree of automation during manufacture of the headlamp, since fewer cables have to be assembled manually. Instead of supplying energy to all light sources in the headlamp by means of a plug plugged onto the lamp base and provided with a connection cable, as was previously the case in the prior art, with the headlamp according to invention it is sufficient to connect electrical supply contacts of the headlamp to the on-board supply voltage in order to supply energy to the integrated gas discharge lamp 5. The powering of the lamps provided in the headlamp by the supply contacts of the headlamp is achieved by a fixed wiring in the headlamp. The wiring of the headlamp 3 and of the integrated gas discharge lamp 5 is considerably simplified.

The first embodiment of the lamp in FIGS. 1 and 2 shows a further variation of the mechanical adjustment. In this case the protrusions 703 are arranged on the side of the reference ring 702 facing the gas discharge lamp burner 50. In this variation the protrusions 703 come to lie on corresponding counterfaces on the rear face of the reflector in order to define the position of the integrated gas discharge lamp 5 relative to the reflector 33. The integrated gas discharge lamp 5 is pressed from behind against the reference faces of the reflector 33. However, this variation poses the drawback that the position between the optically effective inner face of the reflector has to be tolerated very precisely in order to achieve precise optical imaging.

The system of the headlamp interface of the second embodiment is also suitable for achieving further simplified wiring in modern bus systems. The integrated gas discharge lamp 5 thus has further contacts 230, 240, in addition to the two electrical contacts 210, 220, via which communication is provided with the on-board electronics system of the motor vehicle. The connection element 35 has two slits 351, 352 each comprising two corresponding counter-contacts. In a further embodiment (not shown) merely three electrical contacts are provided on the lamp: two which essentially supply the electric lamp power, and a logic input (also called a remote-enable pin) with the aid of which the lamp can be switched on and off in a virtually power-free manner by the on-board electronics system of the motor vehicle.

In addition to the advantage that swapping of electric connections is impossible, this "Snap Lite" interface also affords a further advantage: since the lamp is only powered when it is arranged in the headlamp in its intended place, the power supply 57 of the gas discharge lamp burner 50 remote from the base is only contacted when the integrated gas discharge lamp 5 is securely out of operation. The level of safety when handling such a high-pressure discharge lamp is thus dramatically increased. The simple installation of the integrated gas discharge lap 5 in the headlamp 3 means that the end customer is able to replace a lamp of this type. The integrated gas discharge lamp 5 is thus more cost effective for the end customer since he does not have to seek out a repair shop in order to change the lamp.

By inserting the integrated gas discharge lamp 5 into the reflector 33, the ground connection of the lamp to the headlamp housing is also formed. For example, this can be achieved by spring steel sheet strips fixed to the reflector 33 and connected to the ground potential of the vehicle. When inserting the lamp into the headlamp the spring steel sheet strips contact the electrically conductive surface of the housing of the integrated gas discharge lamp 5 and produce an electric connection between the vehicle ground and the internal ground or ground shield of the integrated gas discharge lamp. For example, this contact may be produced on the side wall or on the end face of the housing 72. In the present case the ground connection is achieved by means of the ring seal 71, which is conductive. If the surface of the housing is not electrically conductive, or else is not completely electrically conductive, the spring steel sheet strips are contacted with a contact face on the surface of the housing of the integrated gas discharge lamp. This contact face or these contacts faces has/have an electrically conductive connection to the internal ground or ground shield of the integrated gas discharge lamp.

Figure 31:
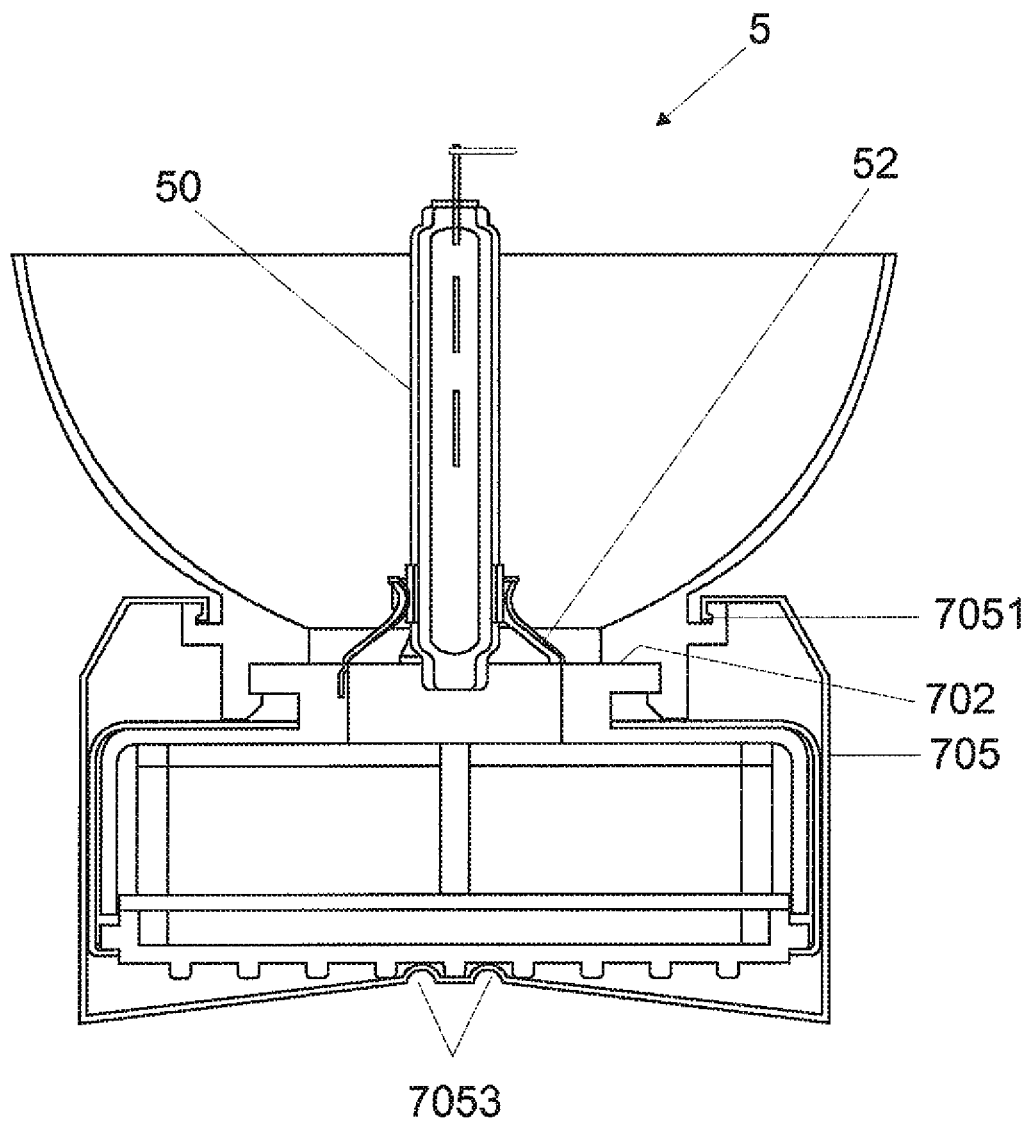
FIG. 31 shows a sectional view of a fifth embodiment of an integrated gas discharge lamp according to the invention.

A further fifth embodiment with a conventional interface to the headlamp is shown in FIG. 31. In this case the integrated gas discharge lamp 5 is pressed via the reference face 702 onto a corresponding counterface of the headlamp socket by means of a retaining clip 705. The integrated gas discharge lamp 5 is electrically connected to the headlamp in a conventional manner. The retaining clip 705 ensures that the integrated gas discharge lamp 5 is effectively connected to the socket in the headlamp via its reference face 702, and thus ensures that the electrodes are accurately orientated in the optical system of the headlamp. The electrodes 504 of the gas discharge lamp burner 50 of the integrated gas discharge lamp 5 are adjusted relative to the reference face 702 during the manufacturing process of the integrated gas discharge lamp 5. The arc of the integrated gas discharge lamp 5 thus adopts a defined position in the reflector upon its insertion into the headlamp, which enables precise optical imaging. As a result of the spring effect of the retaining clip 705, this imaging is also ensured even under difficult conditions, such as vibrations which may occur in a car headlamp. The retaining clip is in turn hooked into a groove 7051 on the headlamp side, which groove holds said retaining clip securely, although the retaining clip can still be unhooked from the groove easily when the lamp is changed. The retaining clip 705 engages in the base plate 74 on the base side via two bulges 7053. However, it is also conceivable that the retaining clip 705 may comprise no bulges and therefore lies on the ribs of the base plate. The fifth embodiment of the gas discharge lamp 5 according to the invention makes it possible to achieve a simple and cost-effective connection to a headlamp which does not impose any restrictions in terms of the positioning accuracy in the optical system of the headlamp.

Ignition Transformer

Figure 10:
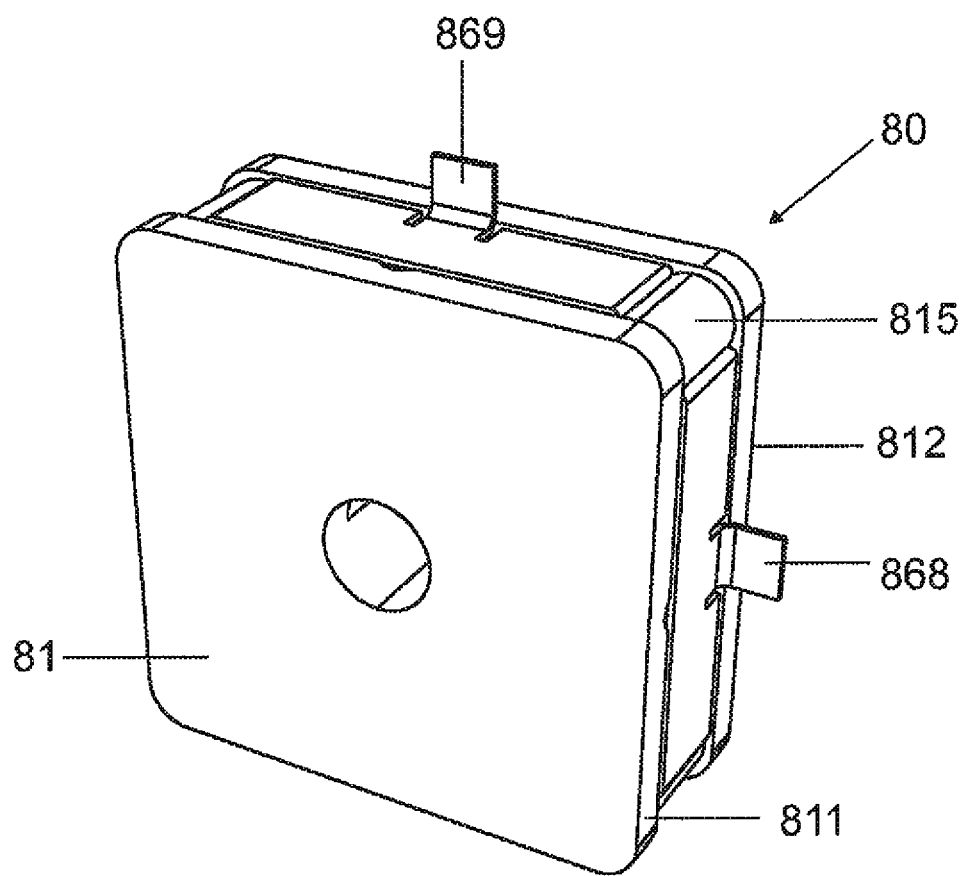
FIG. 10 shows a perspective view of an ignition transformer of the integrated gas discharge lamp.

The construction of the ignition transformer 80 of the integrated gas discharge lamp 5 will now be described. FIG. 10 shows a perspective view of a first embodiment of the ignition transformer 80, in which the ignition transformer 80 has a square, flat shape. However, other embodiments are also conceivable in which the ignition transformer 80 can have a round, hexagonal, octagonal or another suitable shape. Further embodiments will be described further below. In this instance the shape is to be understood to mean the shape of the base area of the substantially prismatic outer dimensions of the ignition transformer, the rounded portions at the edges of the body being ignored. In the particularly advantageous embodiment shown in this instance the prism is short in height, in particular has a height which is less than ⅓ of the diagonal or diameter of the geometry forming the base area.

The ignition transformer 80 has a ferrite core 81 which is assembled from a first ferrite core half 811 and an identical second ferrite core half 812. The ignition transformer 80 has a plurality of outwardly pointing tabs 868, 869 on the sides, which tabs mechanically fix the ignition transformer 80 in place.

Figure 11:
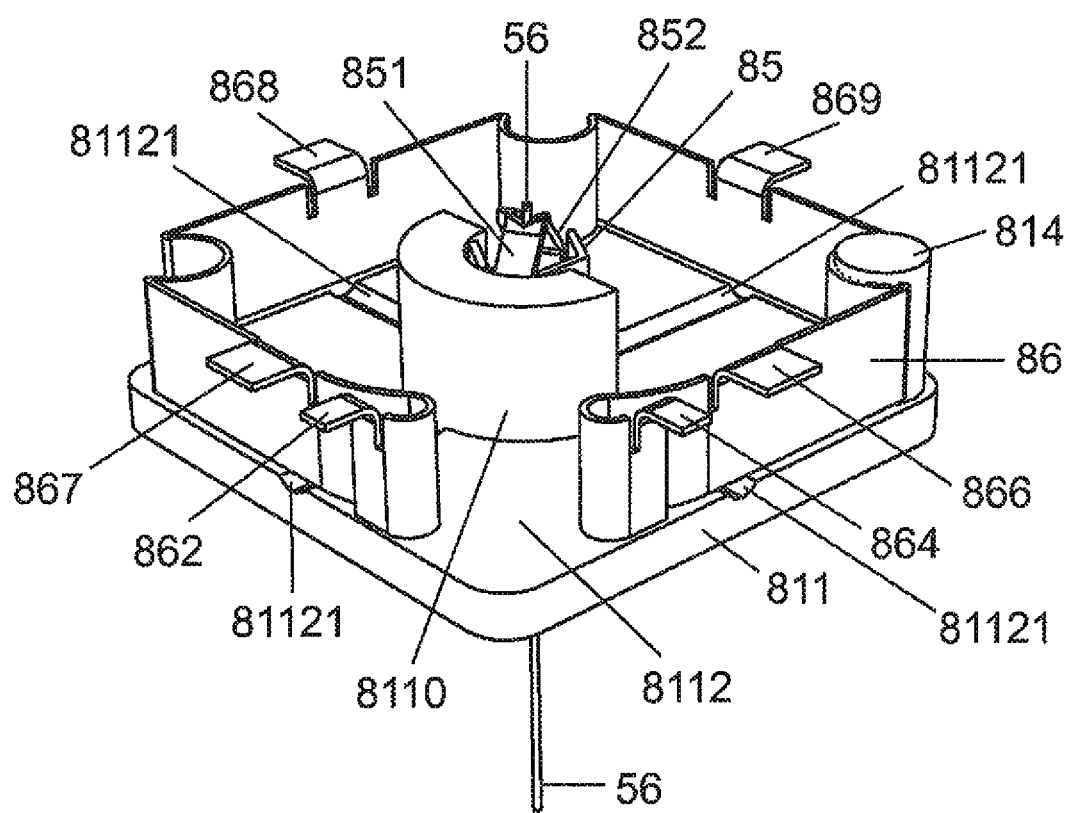
FIG. 11 shows a perspective view of the upper part of the ignition transformer.

FIG. 11 shows a perspective view of the upper part of the ignition transformer, in which the primary winding and the second ferrite core half 812 are not visible. The first ferrite core half 811 is formed of a square side wall 8112, from which a hollow semi-cylinder 8110 projects centrally inwardly. The inner face of the square side wall 8112 has elongated recesses 81121, which extend from the outside in, on the side facing the coil. As a result of these recesses an impregnating varnish or a casting compound, into which the ignition transformer 80 is introduced after completion for high-voltage isolation, can penetrate into the ignition transformer 80 from the outside inwards in order to uniformly wet all the turns of the ignition transformer 80.

Figure 12:
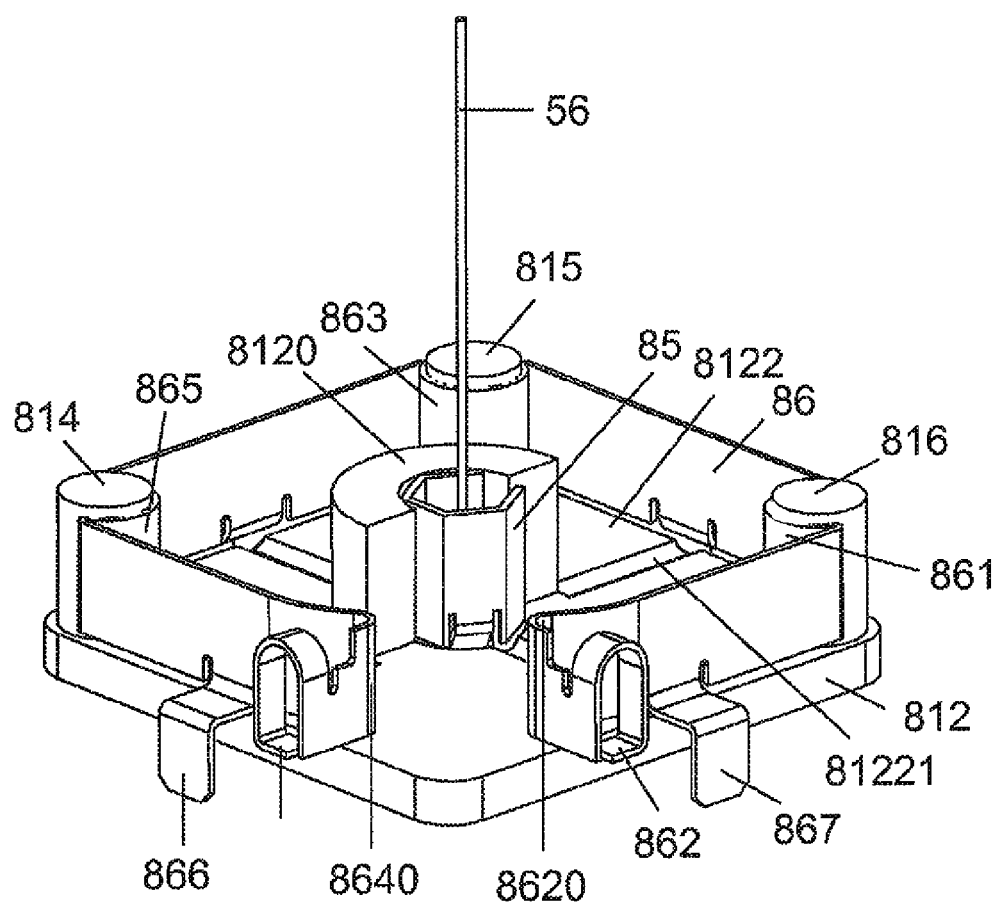
FIG. 12 shows a perspective view of the lower part of the ignition transformer.

A primary winding 86 sits on the outer edge between the two ferrite core halves 811, 812 and consists of a stamped bent part formed from sheet metal. The sheet metal is preferably made of a nonferrous heavy metal, such as copper, bronze or brass. The sheet metal is preferably resiliently deformable and flexible. The primary winding 86 is essentially a long strip which extends externally between two ferrite core halves 811 and 812. In a first variation the primary winding 86 passes over three corners of the ignition transformer 80 via only one turn whereas the fourth corner is open. The sheet metal strip of the primary winding 86 is thus a three-quarter turn placed around the outer contour of the ignition transformer and ends slightly before the fourth corner. The sheet metal strip of the primary winding 86 comprises the tabs 866, 867, 868 and 869, which have already been mentioned above, which are attached in the lateral direction of the sheet metal strip. The four tabs mechanically fix the ignition transformer 80, and for this purpose they may be soldered, for example, onto a printed circuit board of the ignition electronics system 910 as a flat SMD tab or soldering lug. However, the tabs may also comprise a further 90° deflection, the tabs then being passed through the printed circuit board of the ignition electronics system 910 and clinched, rotated or soldered on the other side, as can be seen in FIG. 12. The two ends of the sheet metal strip of the primary winding 86 are curved outwardly with a radius by approximately 180°, in such a way that the ends again point away from the fourth corner. In FIG. 12 the two ends are curved outwardly by approximately 90° and the radii are denoted by 8620 and 8640. A laterally protruding tab 862, 864 is attached to each outer end of the sheet metal strip and produces an electric contact. FIG. 12 shows an alternative embodiment of the two tabs 862, 864. Stresses in the connection between the primary winding and the printed circuit board, which may be produced by fluctuations in temperature, are taken up owing to the flexible connection by means of the 180° radius of the two radii 8620 and 8640. The tabs are preferably soldered onto the printed circuit board of the ignition electronics system 910, similarly to a SMD component. The soldering point is not loaded by the mechanical stresses described owing to the aforementioned 180° deflection of the sheet metal strip, and the risk of the soldering point breaking and becoming fatigued is very largely reduced. The alternative embodiment of the tabs 862, 864 has a further 270° radius in the tab itself which further reduces the mechanical stresses in the assembled state.

A contact body 85 is introduced in the centre of the hollow cylindrical inner part of the ferrite core and produces the electrical contact between the gas discharge lamp burner 50 and the inner end of the secondary winding 87 (not shown). The contact body 85 consists of a curved sheet metal part which is connected to the power supply 56, which is close to the base of the gas discharge lamp burner 50. The contact body 85 has two roof faces at its end remote from the burner for contacting the high-pressure discharge lamp electrode. The contact body 85 preferably has two roof faces 851 and 852 on two opposing sides of the end remote from the burner, which roof faces are inclined relative to one another in the manner of a gable roof and are shaped at the ends where the two roof faces contact in such a way that a power supply wire 56 of the high-pressure gas discharge lamp burner 50 is clamped centrally. For this purpose the two roof faces 851 and 852 are provided with a V-shaped contour at the ends where the two roof faces 851, 852 contact. However, the contour may also be round or formed in another suitable manner. For assembly the power supply wire 56 is passed through the contact body 85, cut to length over a predetermined excess and then preferably welded to the contact body by means of a laser.

FIG. 12 shows a perspective view of the lower part of the ignition transformer. The figure shows, inter alia, the second ferrite core half 812, which is shaped identically to the first ferrite core half 811. It, too, is formed of a square side wall 8122, from which a hollow semi-cylinder 8120 protrudes centrally inwards. The inner face of the square side wall 8122 comprises elongated recesses 81221 extending from the outside in. In the figure the side of the contact body 85 close to the burner is visible with its hexagonal open form and the power supply wire 56 passing though. When the two halves are assembled, a hollow cylinder is formed inside, into which the contact body is introduced. Following assembly the ferrite core 81 has the form of an audio tape or film reel except that the outer contour is not round, but instead square with rounded corners.

At the first corner the ignition transformer has a first yoke ferrite 814. The second and third corners are also provided with a second yoke ferrite 815 and a third yoke ferrite 816. The three yoke ferrites are retained by the primary winding 86. For this purpose the sheet metal strip of the primary winding 86 has cylindrical, inwardly pointing rounded portions 861, 863 and 865 at the three corners, in which rounded portions the yoke ferrites 814-816 are clamped. Owing to the springy, resiliently deformable material the three yoke ferrites 814-816 remain securely in place during the production process. The yoke ferrites constitute the magnetic yoke of the ignition transformer 80, via which the magnetic lines of electric flux are retained in the magnet material and therefore cannot cause any interference outside the ignition transformer. This also considerably increases the efficiency of the ignition transformer, and in particular also the level of ignition voltage that can be achieved.

Figure 13:
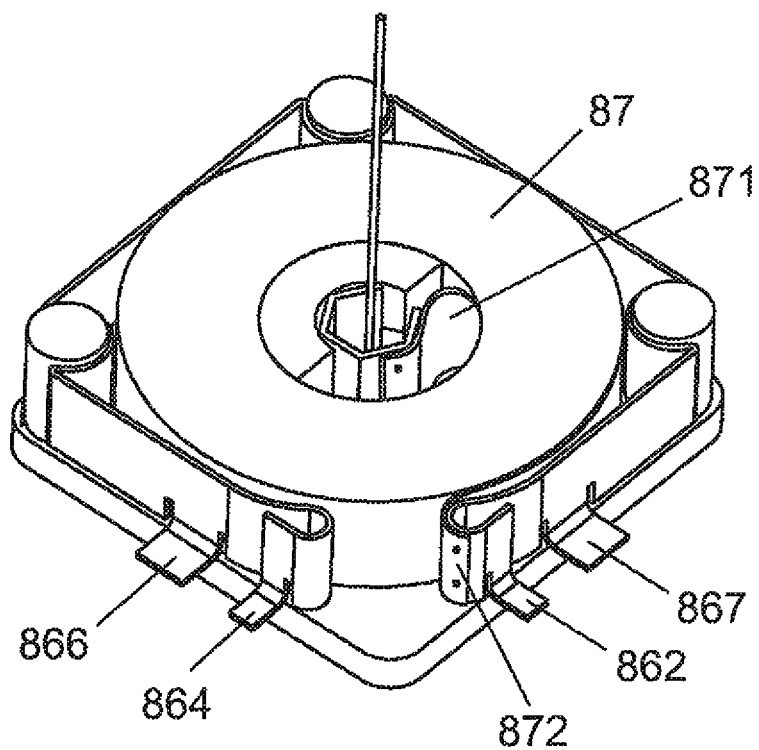
FIG. 13 shows a perspective view of the lower part of the ignition transformer with a visible secondary winding.

FIG. 13 shows a perspective view of the lower part of the ignition transformer 80 with visible secondary winding 87, as it is laid in the second ferrite core half 812 of the ignition transformer 80. The secondary winding 87 consists of an insulated metal strip which is wound similarly to a film with a predetermined number of turns onto the film-reel-like ferrite core, wherein the high-voltage-carrying end comes to lie inside, is guided through the central core of the film-reel-like ferrite core and is connected to the contact body 85 in an electrically conductive manner. The insulation can be attached to the metal strip on all sides, but can also consist of an insulating film that is wound together with the metal strip. The insulating film is preferably wider than the metal strip in order to ensure a sufficient insulation distance. The metal film is wound with the insulating film such that it comes to lie in the middle of the insulating film. A spiral gap is thus produced in the winding body which is filled after the soaking or casting with the impregnating varnish or casting compound and thus provides excellent insulation of the secondary winding 87.

The secondary winding 87 is connected at its inner high-voltage-carrying end 871 to the contact body 85. The outer low-voltage-carrying end 872 of the secondary winding 87 is connected to the primary winding 86. The connections can be produced by soldering, welding or another suitable type of connection. In the present embodiment the connections are laser-welded. For this purpose two welding points are preferably applied per end and connect the two parts to one another in a secure and electrically conductive manner. The inner end 871 of the secondary winding 87 passes through the two hollow cylinder halves 8110, 8120 of the ferrite core 81 and is pinched by them. The outer end 872 of the secondary winding 87 is thus connected to the end of the primary winding 86 such that the direction of winding of the secondary winding 87 is oriented against the direction of winding of the primary winding 86. However, depending on requirements the outer end of the secondary winding 87 can also be connected to the other end of the primary winding 86, in such a way that the direction of winding of the primary and secondary windings is the same.

The diameter and height of the ignition transformer 80, which is accommodated in the integrated gas discharge lamp 5, will be defined hereinafter largely irrespectively of its geometry and based on the dimensions of the ferrite core so as to provide a simpler description. The height of the ignition transformer is to be understood to mean the distance between the two outer faces of the two side walls remote from the winding in each case, which corresponds approximately to the sum of double the thickness of a side wall and the width of the winding. The diameter of the ignition transformer 80 is to be understood hereinafter to mean, irrespectively of the shape of the side walls, the longest gap inside one of the two side walls, the gap lying within any plane and extending parallel to the outer face of the respective side wall.

In a particularly advantageous embodiment the ferrite core of the ignition transformer has a height of 8 mm and a diameter of 26 mm. The side walls have a diameter of 26 mm and a thickness of 2 mm, and the central core has a diameter of 11.5 mm with a height of 6 mm. The secondary winding consists of 42 turns of a Kapton film 5.5 mm wide and 55 µm thick on which a copper layer 4 mm wide and 35 µm thick is attached centered in the longitudinal direction. In a further particularly advantageous embodiment the secondary winding is wound from two separate films applied one on top of the other, a copper film 75 µm thick and a Kapton film 50 µm thick being used. In both embodiments the secondary winding is connected to the primary winding, which comprises one turn, in an electrically conductive manner, the primary winding being activated by a pulse generation unit comprising an 800 V spark gap.

Figure 14:
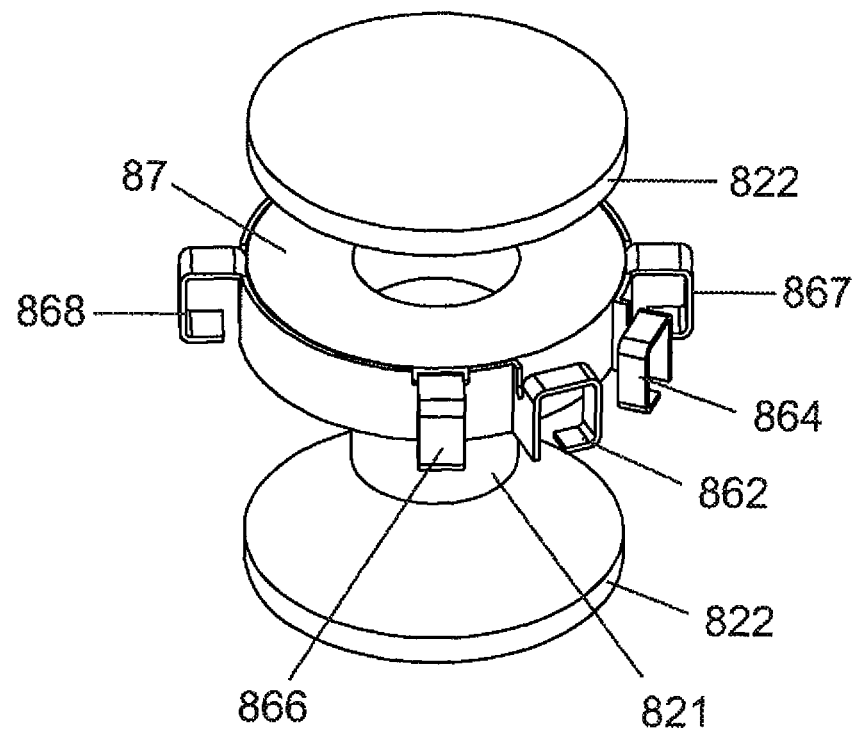
FIG. 14 shows an exploded view of a second, round embodiment of the ignition transformer.

FIG. 14 shows an exploded view of a second embodiment of the ignition transformer 80. Since the second embodiment is similar to the first embodiment of the ignition transformer 80, merely the differences to the first embodiment will be described hereinafter. In the second embodiment the ignition transformer 80 has a round shape, as in the case of a film reel. Owing to the round shape the yoke ferrites 814-816 are omitted and the primary winding 86 has a more simple shape. The laterally protruding tabs for the mechanical fixing of the transformer are in this case designed as SMD tabs which have a deflection of 270° in order to protect the soldering points against excessive mechanical stresses. The two tabs 862, 864 for electrical contact are designed in an identical manner and are arranged radially over the periphery of the ignition transformer 80. The ferrite core 82 of the second embodiment is designed in three parts: it comprises a hollow cylindrical central core 821 which is terminated at either end by round plates 822. The round plates 822 come to lie centrally on the hollow cylinder 821, thus producing the above-described shape of a film reel. The hollow cylinder comprises a slit 823 (not visible in the figure) in order to pass through the inner end of the secondary winding 87 into the interior of the hollow cylinder.

Figure 15:
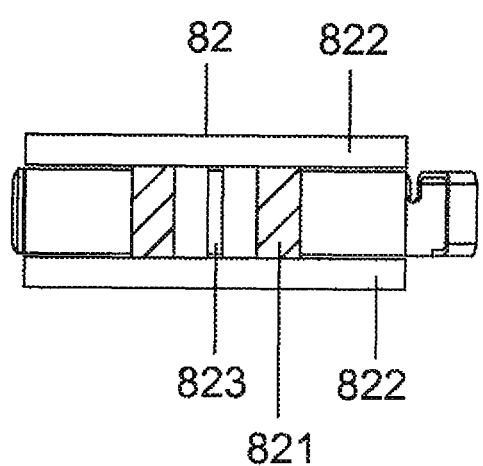
FIG. 15 shows a sectional view of a second, round embodiment of the ignition transformer.

FIG. 15 shows a sectional view of the second embodiment of the ignition transformer 80. In this case the structure of the ferrite core 81 can be well comprehended. In this view the slit 823 can also be seen, through which the inner end of the secondary winding 87 is passed.

Figure 16:
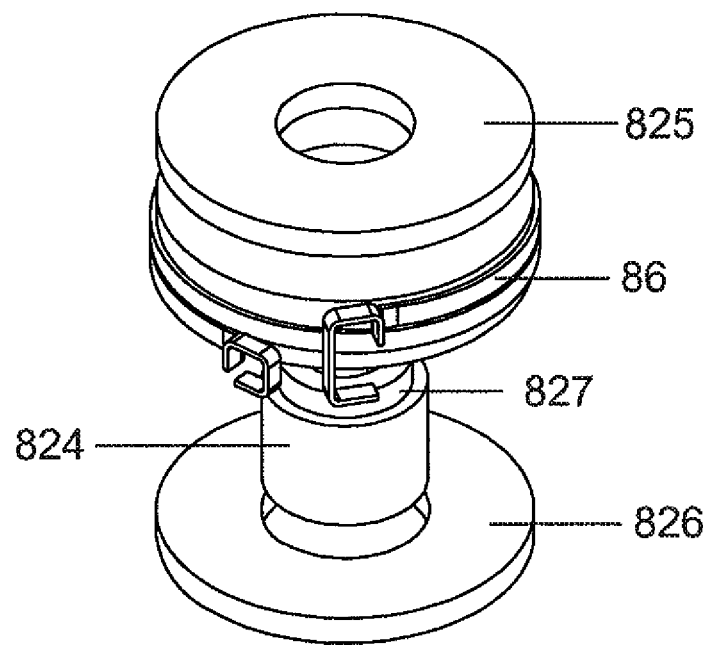
FIG. 16 shows an exploded view of a third, round embodiment of the ignition transformer with a two-turn primary winding.

FIG. 16 shows a third, round embodiment of an exploded view of the ignition transformer with a two-turn primary winding. Since the third embodiment is very similar to the second embodiment of the ignition transformer 80, merely the differences to the second embodiment will be described hereinafter. In the third embodiment the ignition transformer 80 comprises a primary winding with two turns. The metal strip of the primary winding 86 therefore barely passes twice around the ignition transformer. Tabs for electrically contacting the ignition transformer 80 are again attached to the two ends and are designed as a SMD variation. The tabs for mechanical fixing of the ignition transformer 80 are missing in this embodiment and the ignition transformer 80 must therefore be mechanically fixed in a different way. For example, this can be achieved by clamping the ignition transformer 80, as is indicated in FIG. 3. The ignition transformer 80 is in this case clamped between the base 70 and the base plate 74. The base plate 74 thus comprises a base plate dome 741—an elevation on the base plate which clamps the ignition transformer 80 in the installed state. The advantage of this design is the effective cooling of the ignition transformer 80. This can become very hot during operation since it sits very close to the gas discharge lamp burner 50 of the integrated gas discharge lamp 5. Some of the heat which is introduced into the ignition transformer 80 by the gas discharge lamp burner 50 can be removed again owing to the effective heat conductive base plate 74, and the ignition transformer 80 can be effectively cooled.

Figure 17:
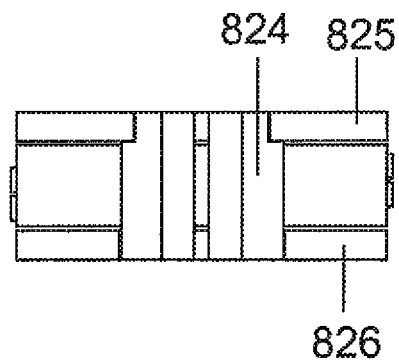
FIG. 17 shows a sectional view of a third, round embodiment of the ignition transformer with a two-turn primary winding.

FIG. 17 shows a sectional view of a third, round embodiment of the ignition transformer 80 with a two-turn primary winding. This sectional view again shows very clearly the core structure of the ferrite core 82. As in the second embodiment the ferrite core 82 is formed of three parts: a central core 824 and two plates 825, 826. The central core 824 is also hollow cylindrical and at one end comprises a shoulder 827 which engages in a round cutout in the first plate 825 and fixes said plate to the central core 824. A second plate 826 also comprises a round cutout, of which the inner radius corresponds to the outer radius of the central core 824. This plate is inserted on the central core and fixed thereby once the secondary can primary windings have been assembled. The plate is inserted until it comes to lie on the secondary winding in order to achieve the most effective magnetic flux possible in the ignition transformer 80.

Asymmetrical Ignition Pulse

The operation of the ignition device of the integrated gas discharge lamp 5 will be explained hereinafter.

Figure 18A:
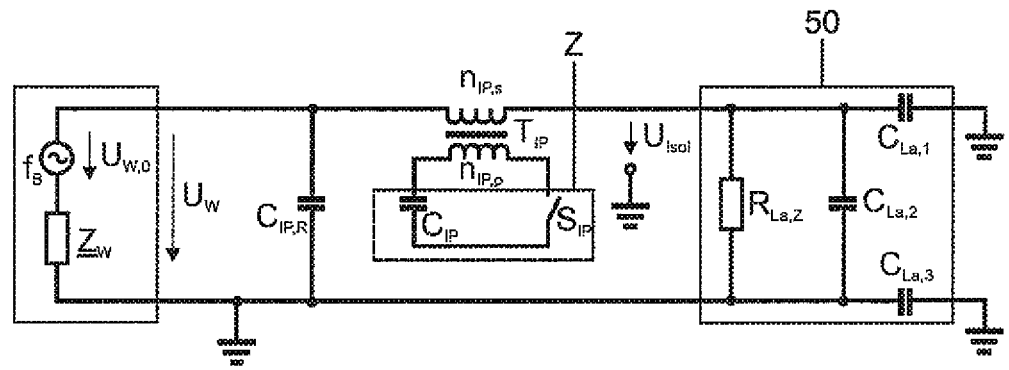
FIG. 18a shows a schematic circuit diagram of an unsymmetrical pulse ignition according to the prior art.

FIG. 18a shows the schematic circuit diagram of an unsymmetrical pulse ignition device according to the prior art. In the case of an unsymmetrical ignition device the ignition transformer $T_{IP}$ is connected in one of the feed lines of gas discharge lamp burner 50, which in this case is shown as an equivalent circuit diagram. This results in an ignition pulse which generates a voltage in only one 'direction' from the ground reference potential, which is generally connected to the other feed line of the gas discharge lamp burner; either a voltage pulse which is positive relative to the ground reference potential or a voltage pulse which is negative relative to the ground reference potential is thus produced. The operation of an unsymmetrical pulse ignition device is widely known and will not be explained here in greater detail. The unsymmetrical voltage is well suited for lamps with a base at one end since the ignition voltage is merely applied to one of the two gas discharge lamp burner electrodes. For this purpose the electrode which is close to the base is routinely selected since it cannot be contacted and thus does not pose any potential risk to individuals during incorrect use. No voltage which could be dangerous to humans is applied at the normally openly guided return conductor and a lamp operated with an unsymmetrical ignition device therefore ensures a specific level of safety. However, the unsymmetrical ignition device poses the drawback of applying the entire ignition voltage to a gas discharge lamp electrode. The losses through corona discharges and other effects caused by the high voltage thus increase. This means that only some of the ignition voltage generated is actually applied to the gas discharge lamp burner 50. A higher ignition voltage must therefore be generated than is necessary, which is involved and expensive.

Figure 18B:
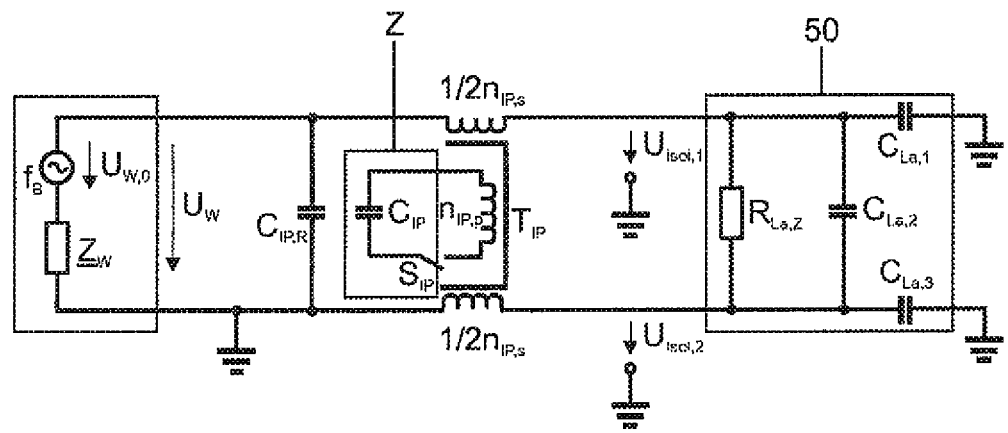
FIG. 18b shows a schematic circuit diagram of a symmetrical pulse ignition device according to the prior art.

FIG. 18b shows the schematic circuit diagram of a symmetrical pulse ignition device according to the prior art. The symmetrical pulse ignition device comprises an ignition transformer $T_{IP}$ which has two secondary windings which, together with the primary winding, are magnetically coupled. The two secondary windings are oriented in such a way that the generated voltage of both secondary windings is added together at the lamp. The voltage is thus divided approximately in half over the two gas discharge lamp electrodes.

As already mentioned above, the losses through corona discharges and other parasitic effects are thus reduced. The reasons for the generally greater ignition voltage in the case of symmetrical pulse ignition only become clear upon closer observation of the parasitic capacitances. For this purpose the equivalent lamp circuit diagram of the gas discharge lamp burner 50 is observed in FIG. 18b. A large proportion, if not the biggest proportion of the parasitic lamp capacitance $C_{La}$ is not caused by the lamp itself, but by the connection between the lamp and the ignition unit, for example by the lamp lines. However, these do not only have parasitic capacitances from conductor to conductor, but also between conductor and the surrounding environment. Proceeding simply from a description with concentrated energy stores, the parasitic capacitances between the two conductors and the two gas discharge lamp electrodes can be combined to give $C_{La,2}$, as shown in FIG. 18b. The parasitic capacitances present in each case between the conductor and the outside environment are modeled by $C_{La,1}$ and $C_{La,3}$. The potential of the surrounding environment, for example of the housing, will be considered hereinafter to be spatially constant and is illustrated by the grounding symbol, even though this does not have to correspond to the PE or PEN within the meaning of a low-voltage network. Furthermore, a symmetrical construction and therefore $C_{La,1}=C_{La,3}$ are thus assumed. The parasitic lamp capacitance is given in accordance with the expanded equivalent circuit diagram to give $C_{La,2}+\frac{1}{2}C_{La,1}$.

The difference between the unsymmetrical pulse ignition and the symmetrical pulse ignition is considerable if it is taken into account that the converter and the ignition unit also exhibit parasitic capacitances relative to the surrounding environment. These are sometimes intentionally increased (for example line filters) and are generally substantially greater than the parasitic capacitances observed above of the lamp relative to the surrounding environment, and therefore an electronics system at the potential of the surrounding environment is assumed in order to simplify observation of the ignition. If the voltage UW is ignored, in the case of unsymmetrical ignition $C_{La,1}$ and $C_{La,2}$ are therefore to be charged onto the ignition voltage, whereas in the case of symmetrical ignition $C_{La,2}$ is to be charged onto the ignition voltage and $C_{La,1}$ and $C_{La,3}$ are to be charged onto the half ignition voltage in each case. With the exception of a symmetrical construction, i.e. $C_{La,1}=C_{La,3}$, less energy is thus required for the charging of the parasitic capacitances with symmetrical pulse ignition than for the unsymmetrical variation. In the extreme case $C_{La,1}=C_{La,3}\gg C_{La,2}$ the ignition unit according to FIG. 18a has to provide practically double the energy compared to the ignition unit according to FIG. 18b.

A further advantage of the symmetrical ignition lies in the lower insulation strength required relative to the surrounding environment, since the prevailing voltages $U_{Isol,1}$ and $U_{Isol,2}$ are only half the value compared to the voltage $U_{Isol}$ in the case of unsymmetrical ignition. At the same time this demonstrates the drawback of symmetrical pulse ignition and the reason why it often cannot be used: in the case of symmetrical ignition both lamp terminals carry high voltage, which is often inadmissible for safety reasons, since in many lamp and base constructions one of the two lamp terminals, normally the terminal remote from the lamp which is then referred to as the 'lamp return conductor', can be contacted.

This shows that the symmetrical ignition method is optimized for gas discharge lamps with a base at either end, which are already designed symmetrically in terms of mechanical construction. In the case of a gas discharge lamp with a base at one end there is the problem of ignition voltage, as already mentioned before, which is applied to the open gas discharge lamp electrode which is remote from the base and can be reached by the user. A further problem is the voltage applied to the gas discharge lamp electrode remote from the base with regard to the potential of the reflector. The reflector, in which the gas discharge lamp is incorporated, is normally grounded. At the moment of ignition a high voltage is thus applied between the return conductor of the electrode remote from the base and the reflector. This can lead to arcing on the reflector, which may result in failures. For these reasons a symmetrical ignition is unsuitable for gas discharge lamps with a base at one end.

Furthermore, it should be noted that the insulation outlay increases in a non-linear manner with the voltage to be insulated. As a result of non-linear effects in insulating materials the distance between two conductors must typically be more than doubled with a doubling of the voltage in order to obtain no arcing/blow-out.

In addition to the above-described, purely capacitive behavior of the surrounding environment and of the insulating materials involved, an active power conversion in the insulating materials, for example by corona discharges, partial discharges, etc. can no longer be ignored from a specific voltage and the field strengths prevailing in the insulating materials and at the interfaces thereof. In the above equivalent circuit diagrams additional non-linear resistors are to be supplemented parallel to the capacitors. From this aspect, too, symmetrical pulse ignition is preferred to unsymmetrical pulse ignition.

To conclude, it is observed that from a specific voltage load of the insulating material, said material alters considerably quickly and thus a considerably increased service life can be provided even with a slight voltage reduction.

Figure 19:
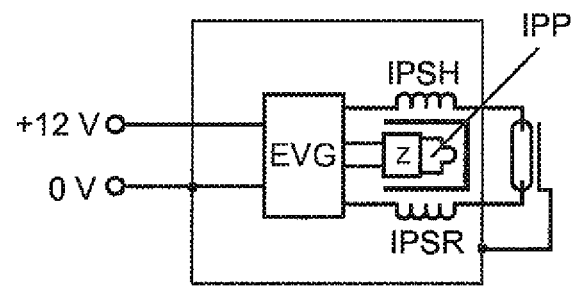
FIG. 19 shows a schematic circuit diagram of an asymmetrical pulse ignition device.

A good compromise which combines the advantages of the two ignition methods is asymmetric pulse ignition, as can be seen in the schematic representation in FIG. 19. It has a similar construction to symmetrical ignition, but the two secondary windings have different numbers of turns. The drawback of the symmetrical ignition method is primarily that accidental contact of the return conductor during the ignition process and thus the contacting of a high-voltage-carrying metal part by the user cannot be ruled out. In the case of the integrated gas discharge lamp 5 which comprises the above-described headlamp interface according to FIG. 5, this can be excluded since the voltage is only supplied to the electronics once the headlamp has been inserted. It is thus impossible to contact the return conductor, if it is live, of the electrode remote from the base when the headlamp is intact. As already mentioned above, symmetrical ignition is also not possible in this instance since arcing has to be suspected over the normally grounded reflector. Asymmetric ignition is therefore proposed, which for example gives ¾ of the ignition voltage over the electrode close to the base, and for example gives ¼ of the ignition voltage over the electrode remote from the base. The exact voltage ratio between the electrodes of the gas discharge lamp burner 50, i.e. that of the first lamp electrode close to the base and of the second lamp electrode remote from the base depends on many factors, lamp size and the base construction. The voltage ratio between the first lamp electrode close to the base and the second lamp electrode remote from the base can range from 22:1 to 5:4. Voltages of 2 . . . 8 kV are preferably generated over the return conductor secondary winding IPSR of the ignition transformer $T_{IP}$, and voltages of 23 . . . 17 kV are preferably generated over the delivery conductor secondary winding IPSH of the ignition transformer $T_{IP}$. Preferred transfer ratios between the two secondary windings unequal to 1 are thus produced, namely $n_{IPSR}:n_{IPSH}=2:23 \ldots 8:17$. This can also be expressed as the equation $n_{IPSR}=0.04 \ldots 0.8*n_{IPSH}$. The construction is thus similar to that of a symmetrical igniter, but the secondary windings are not distributed uniformly.

The number of primary turns n, of the ignition transformer $T_{IP}$ preferably lies between 1 and 4, while the sum of the number of turns of both secondary windings IPSH and IPSR preferably lies between 40 and 380.

The pulse ignition unit Z in FIG. 19 is further known from the prior art and will not be described here in greater detail. It consists of at least one capacitor which is connected to the primary winding of the ignition transformer via a switch element. A switch element with a nominal trip voltage between 350 V and 1300 V is preferably used. This may be a switching spark gap or a thyristor with a corresponding control circuit. In the present first embodiment the ignition transformer $T_{IP}$ has a transfer ratio $n_{IPP}$:$n_{IPSR}$:$n_{IPSH}$ of 1:50:150 turns, which is operated by an ignition unit Z based on a 400 V spark gap, i.e. with a spark gap with a nominal trip voltage of 400 V. The ignition transformer $T_{IP}$ supplies a peak voltage of +5 kV to ground to the electrode, which is remote from the base, of the gas discharge lamp burner 50, and a peak voltage of −15 kV to ground to the electrode, which is close to the base, of the gas discharge lamp burner 50.

In a further second embodiment the ignition transformer is designed with a transfer ratio of 3:50:100 turns, and is operated with an ignition unit Z based on a 800 V spark gap. This supplies a peak voltage of −8 kV to ground to the electrode, which is remote from the base, of the gas discharge lamp burner 50, and a peak voltage of +16 kV to ground to the electrode, which is close to the base, of the gas discharge lamp burner 50.

Figure 20:
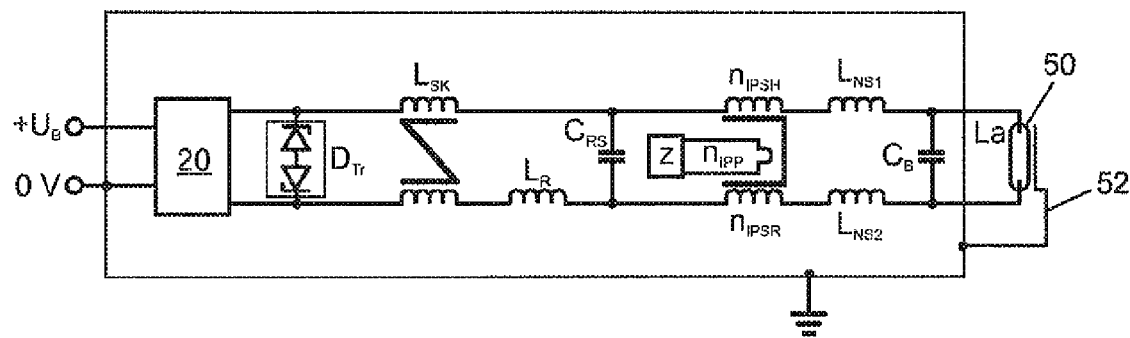
FIG. 20 shows a schematic circuit diagram of an extended circuit of the integrated gas discharge lamp.

FIG. 20 shows the schematic circuit diagram of an expanded circuit of the integrated gas discharge lamp 5. In this case one or two unsaturated choke coils $L_{NS1}$ and $L_{NS2}$ are each connected between the high-voltage-carrying end of a secondary winding and the respective burner connection in order to prevent interfering impulses with high voltage peaks ('glitches'). Inductance values of 0.5 uH to 25 uH, preferably of 1 uH to 8 uH are used. Furthermore, a high-voltage fixed capacitor $C_B$ (a 'burner capacitor') can be connected directly parallel to the gas discharge lamp burner and thus between the gas discharge lamp burner and the unsaturated choke coils. This capacitor normally has a capacitance less than 22 pF so as not to dampen the ignition pulse too excessively. It preferably has a capacitance between 3 pF and 15 pF. The capacitor can be formed, in terms of construction, by a corresponding arrangement and configuration of the insert-molded lamp power supplies, for example in the form of plates. The capacitor has two positive effects: on the one hand it is advantageous for the EMC behavior of the lamp since high-frequency interference which is generated by the lamp is short-circuited directly at the place where it is generated, and on the other hand it ensures a lower resistance breakthrough of the burner, which in particular facilitates a take-over by the operating circuit 20.

By means of a yoke capacitor $C_{RS}$ with a capacitance value which preferably lies between 68 pF and 22 nF, a termination of the pulse igniter is achieved relative to the EB for the very quick pulse generated by the ignition transformer $T_{IP}$ and this termination has a very low impedance. It is estimated to a very acceptable degree that the high-voltage ignition pulses generated thus completely contact the burner. The return capacitor $C_{RS}$ forms a low-pass filter together with a return conductor choke coil $L_R$. This counteracts electromagnetic interference and protects the EB output against inadmissibly high voltages. The expanded circuit also has a current-compensated choke coil $L_{SK}$ which also counteracts electromagnetic interference. A suppressor diode $D_{Tr}$, also known as a clamping diode, limits the voltage generated owing to the ignition process at the operating circuit 20 and thus protects the output of the operating circuit 20.

Figure 21:
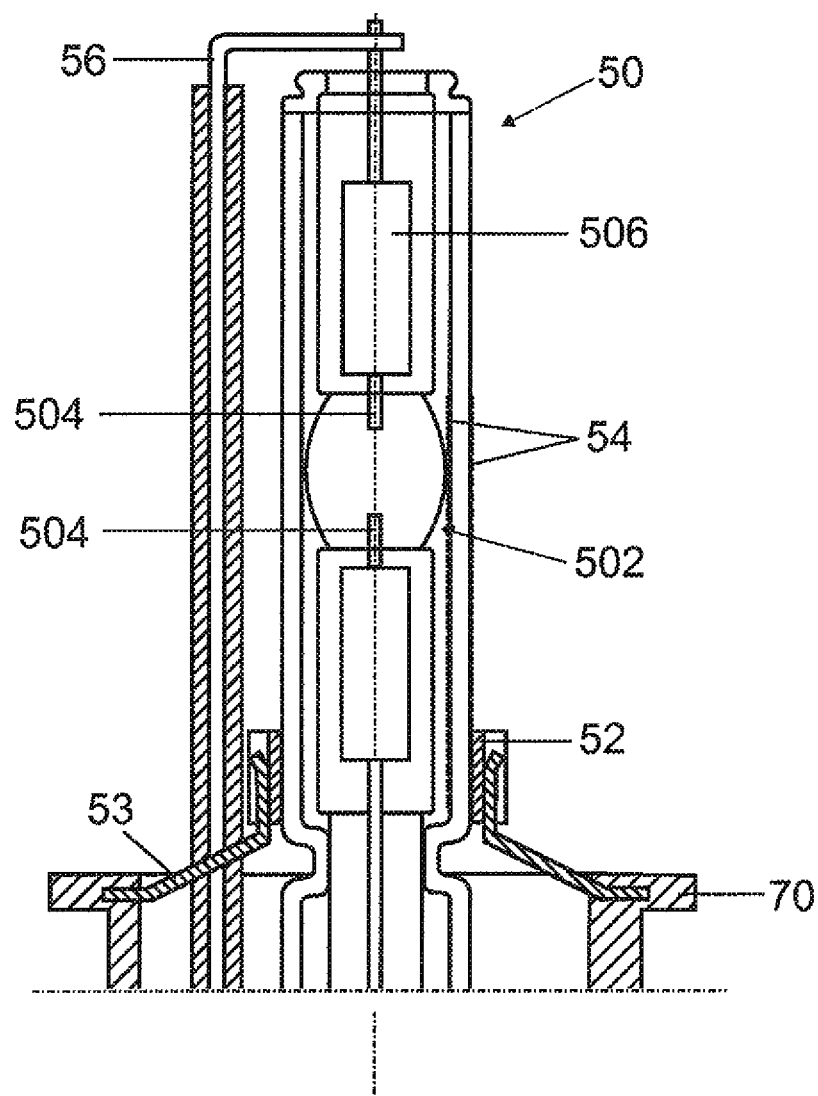
FIG. 21 shows a sectional view of the gas discharge lamp burner of the integrated gas discharge lamp showing the base construction.

The gas discharge lamp burner 50 of the integrated gas discharge lamp 5 is fixed to the base 70 by means of a metal clamp 52 and four retaining plates 53 (see FIG. 1 for example). As already indicated in FIG. 20, this metal clamp 52 is now grounded, i.e. in the case of an integrated gas discharge lamp for cars, for example is connected to the ground of the car body. Due to the grounding of the metal clamp, an arcing from the metal clamp to the headlamp is reliably prevented, since both parts are at the same potential even during the ignition process. Furthermore, a particularly good capacitive coupling to an ignition auxiliary coating present on the gas discharge lamp burner vessel is established by the grounding of the metal clamp. Such ignition auxiliary coatings are often applied in the case of high-pressure discharge lamp burners in order to reduce the high ignition voltages. This measure increases the ignition-voltage-reducing property of the ignition auxiliary coating present on the gas discharge lamp burner vessel. It is particularly advantageous if the capacitive influence of the metal clamp on the gas discharge lamp burner (optionally including the ignition auxiliary coating thereof) is increased. To do this, further electrically conductive parts are coupled to the metal clamp galvanically or capacitively. This results in a type of "third electrode", which consists of a plurality of "individual electrodes coupled to one another" and which is grounded on one side. For example, this third electrode may also include a metal coating 54 on the outer bulb in addition to the metal clamp, as is indicated in FIG. 21. The coating may in this case be applied to the outer face and/or the inner face of the outer bulb. The coating consists of electrically conductive, for example metal material and is preferably applied in a strip parallel to the return conductor. Due to this, the metal coating 54 is not seen and, in addition, there is a minimum distance and thus maximum coupled capacity to the ignition auxiliary coating on the burner vessel. The coating on the outer bulb may be coupled to the metal clamp capacitively or galvanically. For a galvanic coupling it is particularly advantageous if the outer coating is electrically contacted with the metal clamp by the fixing of the burner in the metal clamp, which can be achieved by means of an established assembly method in accordance with the prior art without additional outlay. The coating preferably extends over 1% to 20% of the outer bulb circumference.

The positive effect of the grounded metal clamp on the ignition voltage of a gas discharge lamp results from the following physical relationship: due to the fact that with a grounded metal clamp and an asymmetric pulse ignition a high voltage is applied between the metal clamp and both gas discharge lamp electrodes, a dielectric barrier discharge in the outer bulb is promoted in the vicinity of both gas discharge lamp electrodes. The dielectric barrier discharge in the outer bulb promotes an arcing in the burner vessel. This is promoted by the UV light, which is generated with the dielectric barrier discharge and is barely absorbed by the burner vessel, and promotes the generation of free charge carriers at the electrodes and in the discharge chamber and thus reduces the ignition voltage.

The metal clamp and the reference plane to the reflector of the integrated gas discharge lamp 5 may consist of a metal part, which has corresponding anchors which are coated with plastics material and ensure a good mechanical connection to the base 70. The metal clamp is then grounded automatically by inserting the lamp into the reflector or headlamp respectively. This now makes the reference plane more robust with respect to mechanical wear, which is advantageous due to the increased weight of an integrated gas discharge lamp 5. The configuration according to the prior art only provides for a plastics material injection-molded part as a reference plane.

In a preferred embodiment of the integrated gas discharge lamp 5, the base consists of two parts. A first part comprising a gas discharge lamp burner 50, which has already been aligned and is embedded into a base made of plastics material by means of the metal clamp 52 and the retaining plates 53, said base comprising, as described above, a metal-reinforced reference plane. This first part is connected to a second part, which contains the ignition and operating electronics systems. The connections for the lamp and the power feeds may be provided by means of welding or soldering, or by means of a mechanical connection such as a plug contact or an insulation displacement contact.

FIG. 21 shows a gas discharge lamp burner 50, which will be described hereinafter. The gas discharge lamp burner 50 is preferably a mercury-free gas discharge lamp burner, however a mercury-containing gas discharge lamp burner may also be used.

The gas discharge lamp burner 50 accommodates a gastight, closed discharge vessel 502, in which electrodes 504 and an ionizable filling for generating a gas discharge are enclosed, wherein the ionizable filling is preferably designed as a mercury-free filling which includes xenon and halogenides of the metals sodium, scandium, zinc, and indium, and the weight ratio of the halogenides of zinc and indium lies in the range of 20 to 100, is preferably 50, and wherein the cold filling pressure of the xenon gas lies in the range of 1.3 megapascals to 1.8 megapascals. It has been found that, as a result, the decrease in the luminous flux over the operation period of the gas discharge lamp burner 50 and the increase in the burner voltage of the gas discharge lamp burner 50 over the operation period thereof can be reduced. This means that the gas discharge lamp burner 50 has an improved luminous flux maintenance compared to a gas discharge lamp burner according to the prior art and demonstrates a longer service life due to the reduced burner voltage increase over the operation period. In addition, the gas discharge lamp burner 50 exhibits only a slight shift of the chromaticity coordinate of the light emitted by it over its operation period. In particular, the chromaticity coordinate only moves within the limits permitted in accordance with ECE Rule 99. The comparatively high cold filling pressure of the xenon as well as the comparatively high weight proportion of the halogenides of the zinc contribute substantially to the setting of the burner voltage of the gas discharge lamp burner 50, i.e. the voltage which is set, after the completion of the ignition phase, in the quasi-stationary operating state over the discharge gap of the gas discharge lamp burner 50. The halogenides of the indium are present in such a small weight proportion that they do contribute to the setting of the chromaticity coordinate of the light emitted by the gas discharge lamp burner, but they do not contribute significantly to the setting of the burner voltage of the gas discharge lamp burner 50. The halogenides of indium, as well as the halogenides of sodium and scandium, are mainly used for light emission in the gas discharge lamp burner 50.

Advantageously, the weight proportion of the halogenides of zinc lies in the range of 0.88 micrograms to 2.67 micrograms per 1 mm$^3$ of discharge vessel volume, and the weight proportion of the halogenides of indium lies in the range of 0.026 micrograms to 0.089 micrograms per 1 mm$^3$ of discharge vessel volume. Iodides, bromides, or chlorides may be used as halogenides.

The weight proportion of the halogenides of sodium advantageously lies in the range of 6.6 micrograms to 13.3 micrograms per 1 mm$^3$ of the discharge vessel volume, and the weight proportion of the halogenides of scandium lies in the range of 4.4 micrograms to 11.1 micrograms per 1 mm$^3$ of the discharge vessel volume in order to ensure that the gas discharge lamp burner 50 generates white light having a color temperature of approximately 4000 Kelvin and the chromaticity coordinate remains in the range of white light, preferably within narrow limits, during the service life of the gas discharge lamp burner 50. With a lower weight proportion the losses of sodium (caused by diffusion through the vessel wall of the discharge vessel) and scandium (caused by chemical reaction with the quartz glass of the discharge vessel) can no longer be offset, and with a higher weight proportion the chromaticity coordinate and the color temperature are modified.

The volume of the discharge vessel is advantageously smaller than 23 mm$^3$ so as to be as close as possible to the ideal of a point light source. For the use as a light source in a vehicle headlamp or another optical system, the light-emitting part of the discharge vessel 502, i.e. the discharge chamber with the electrodes enclosed therein, should be as small as possible. Ideally the light source should be point-shaped in order to arrange it in the focus of an optical imaging system. The high-pressure discharge lamp 5 according to the invention is closer to this ideal than a high-pressure discharge lamp according to the prior art, since it preferably comprises a discharge vessel 502 having a smaller volume. The volume of the discharge vessel 502 of the high-pressure discharge lamp 5 is therefore advantageously in the range of 10 mm$^3$ or more to smaller than 26 mm$^3$.

The distance between the electrodes 504 of the gas discharge lamp burner is preferably less than 5 millimeters so as to be as close as possible to the ideal of a point light source. For the use as a light source in a motor vehicle headlamp the electrode distance is preferably 3.5 millimeters. The gas discharge lamp burner 50 is thus optimally adapted to the imaging conditions in the vehicle headlamp.

The thickness or diameter of the electrodes 502 of the gas discharge lamp burner advantageously lies in the range of 0.20 millimeter to 0.36 millimeter. Electrodes having a thickness in this value range may still be embedded in the quartz glass of the discharge vessel in a sufficiently secure manner and at the same time have a sufficient current-carrying capability, which is particularly important during the 'start-up phase' of the high-pressure discharge lamp, during which it is operated with three to five times its nominal power and its nominal current. In the case of thinner electrodes a sufficient current-carrying capability would no longer be ensured in the present embodiment with mercury-free filling, and in the case of thicker electrodes 504 there would be the risk of crack formation in the discharge vessel, caused by the occurrence of mechanical stresses due to the significantly different coefficients of thermal expansion of the discharge vessel material, which is quartz glass, and of the electrode material, which is tungsten or tungsten doped with thorium or thorium oxide.

The electrodes are respectively connected to a molybdenum film 506 embedded in the material of the discharge vessel and allow a gas-tight feedthrough of current, the minimum distance between the respective molybdenum film 506 and the end, which projects into the interior of the discharge vessel 502, of the electrode connected thereto advantageously being at least 4.5 mm in order to ensure a maximum possible distance between the respective molybdenum film 506 and the gas discharge applied at the electrode tip projecting into the discharge vessel 502. The comparatively large minimum distance between the molybdenum films 506 and the gas discharge caused by this has the advantage that the molybdenum films 506 are exposed to a lesser temperature load and a lower corrosion risk due to the halogens in the halogen compounds of the ionizable filling.

Frequency Adjustment

A method for avoiding flicker or jitter phenomena will be described in the following and is carried out by the operating electronics system of the integrated gas discharge lamp 5.

The gas discharge lamps considered herein have to be operated with alternating current, which is primarily generated by the operating electronics system 920. This alternating current may be a high-frequency alternating current, in particular having a frequency above the acoustic resonances occurring in gas discharge lamps, which corresponds to a frequency of the lamp current above approximately 1 MHz in the case of the lamps considered herein. Usually, however, the low-frequency square-wave operation is used, which will be considered below.

With an incorrect mode of operation gas discharge lamps, in particular high-pressure gas discharge lamps, in principle are susceptible to breaks of the arc with a change in direction of the lamp current (the 'commutation'), which can be attributed to an excessively low temperature of the electrodes. Usually, high-pressure gas discharge lamps are operated using low-frequency square-wave current, which is also referred to as "wagging direct current operation". In this case a substantially rectangular current having a frequency of usually 100 Hz up to several kHz is applied to the lamp. At each switching between positive and negative driving voltage, which is provided substantially by the operating electronics system, the lamp current commutates, which results in the lamp current becoming zero for a short period of time. This operation ensures that the electrodes of the lamp are stressed equally despite a quasi-direct current operation.

The arc onset, i.e. the beginning of the arc on the electrode, is in principle problematic during operation of a gas discharge lamp with alternating current. With operation with alternating current the cathode becomes the anode during a commutation and, conversely, an anode becomes the cathode. The cathode-anode transition is relatively unproblematic by nature, since the temperature of the electrode has approximately no impact on its anodic operation. With the anode-cathode transition the capability of the electrode to provide a sufficiently high current depends on its temperature. If it is too low, the arc changes during the commutation, mostly after the zero-crossing, from a point-shaped arc onset operation mode into a diffuse arc onset operation mode. This change is accompanied by an often visible decrease in light emission, which can be observed as jitter.

Logically, the lamp is thus operated in point-shaped arc onset operation mode, since the arc onset in this case is very small and thus very hot. This means that, due to the higher temperature at the small onset point, less voltage is required in this case in order to provide sufficient current.

The process is considered in the following as commutation, in which the polarity of the driving voltage of the gas discharge lamp burner 50 changes, and in which there is thus a large change in current or voltage. With a substantially symmetrical operation mode of the lamp, the voltage or current zero-crossing occurs in the middle of the commutation time. In this case it should be noted that the voltage commutation usually always occurs faster than the current commutation.

It is known from "The boundary layers of ac-arcs at HID-electrodes: phase resolved electrical measurements and optical observations", O. Langenscheidt et al., J. Phys D 40 (2007), pp. 415-431, that with a cold electrode and diffuse arc onset, the voltage initially increases after the commutation, since the excessively cold electrode can only provide the required current by a higher voltage. If the device cannot provide this voltage for operation of the gas discharge lamp, the above-mentioned jitter occurs.

The problem of the alternating arc onset mode primarily affects gas discharge lamps, which have comparatively large electrodes compared to similar lamps of the same nominal power. Typically, lamps are operated with overload when "immediate light" is required, for example as with xenon discharge lamps in the automotive field, in which due to legal regulations 80% of the light output has to be achieved after seconds. These lamps are operated with a power which is substantially greater than their nominal power during a "quick start", also referred to as start-up phase, in order to satisfy the effective automotive standards and regulations. The electrode is thus dimensioned to the high starting power, but is too large in terms of the normal operating state. Since the electrode is now mainly heated by the lamp current flowing therethrough, the problem of littering mainly occurs in older gas discharge lamps, of which the burner voltage is increased at the end of service life. Due to the increased burner voltage, a smaller lamp current flows since the operating electronics system keeps the lamp power constant during the stationary lamp operation by means of control, which results in the electrodes of the gas discharge lamp no longer being sufficiently heated at the end of service life.

With an integrated gas discharge lamp one advantage now lies in the fact that the operating electronics system is inseparably connected to the gas discharge lamp burner, such that the previous burning time, also referred to as cumulative burning time $t_k$, which is obtained by adding together all periods of time during which the gas discharge lamp burner was operated, irrespective of the intermediate periods during which the gas discharge lamp burner was not operated, can be detected by the operating electronics system in a simple manner. For example, this detection may be carried out by means of a time measuring device having a non-volatile memory, which always measures the time when the gas discharge lamp burner 50 is operated and, consequently, an arc is burning between the electrodes. Since the problem of jittering mainly occurs in older lamps, a method is now proposed in which the operating frequency with which the gas discharge lamp burner is operated is adapted to the burning period of the gas discharge lamp burner, such that with an increasing burning period the operating frequency is also increased. This offers the following advantages: the change from anodic and cathodic operation phase, which is accompanied by a temperature modulation of the electrode tips, occurs faster at a higher frequency. Consequently, at a higher frequency the temperature hub of the electrode tips is smaller due to its thermal inertia. Surprisingly, it has been found that no jitter occurs at an electrode temperature which is above a "critical minimum temperature" of the lamp electrodes.

The frequency, however, must not be increased arbitrarily, since otherwise it may result in an excitation of acoustic resonances in the lamp, which may be accompanied by a deformation of the arc as well as by jitter. This effect is possible even from frequencies of 1 kHz, for which reason a frequency of 400 Hz or 500 Hz is usually selected for normal operation, i.e. after the ignition and start-up phase in the stationary operating phase. This frequency will also be referred to as the lower threshold frequency hereinafter. The expression "low cumulative burning time" is considered hereinafter to be a burning time during which the burner 50 of the gas discharge lamp 5 does not yet exhibit the effects of aging, or else only exhibits few effects of aging. This is the case until the cumulative burning time reaches approximately the first 10% of the specified service life of the gas discharge lamp 5. The expression "close to the specified service life" will be considered hereinafter as a service life in which the cumulative burning time slowly reaches the specified service life, for example is between 90% and 100% of the specified service life. The service life specified by the manufacturer will be considered as the specified service life.

Figure 22:
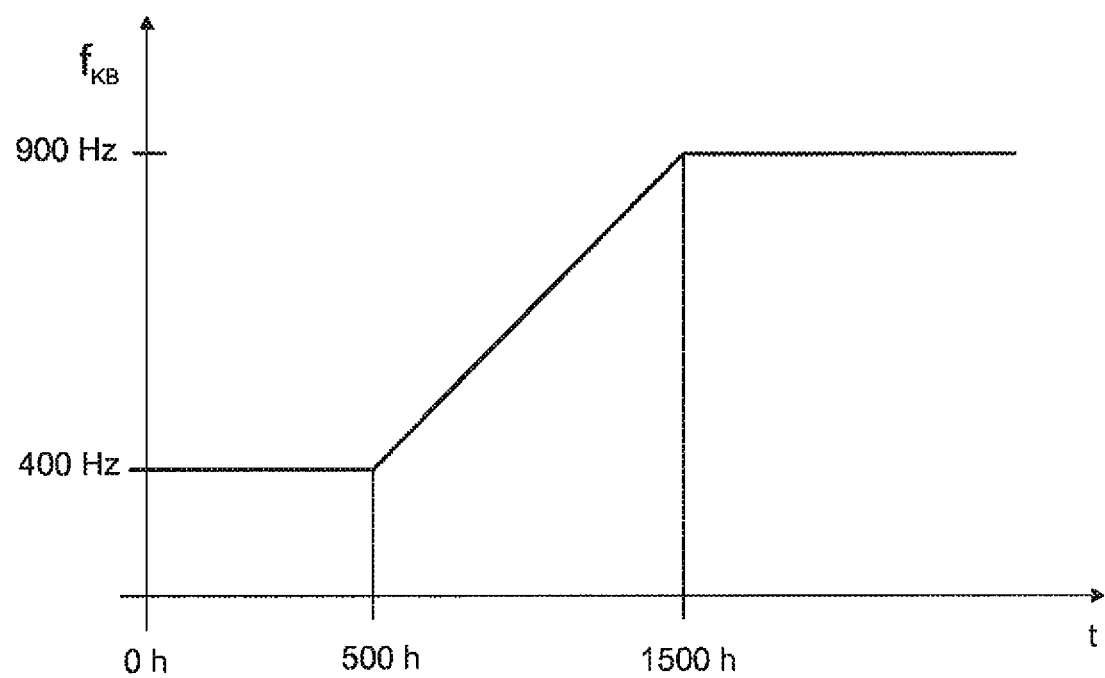
FIG. 22 shows a diagram of the operating frequency of the gas discharge lamp burner over its burning time.

FIG. 22 shows the diagram of a first embodiment of the method, in which the operating frequency of the gas discharge lamp burner is plotted over its burning time. It can clearly be seen that the operating frequency remains constant at 400 Hz for up to a burning time of 500 h, then it is successively increased by 0.5 Hz/h up to 900 Hz during the burning time of 500 h to 1500 h so as to remain at 900 Hz from then on.

Figure 32:
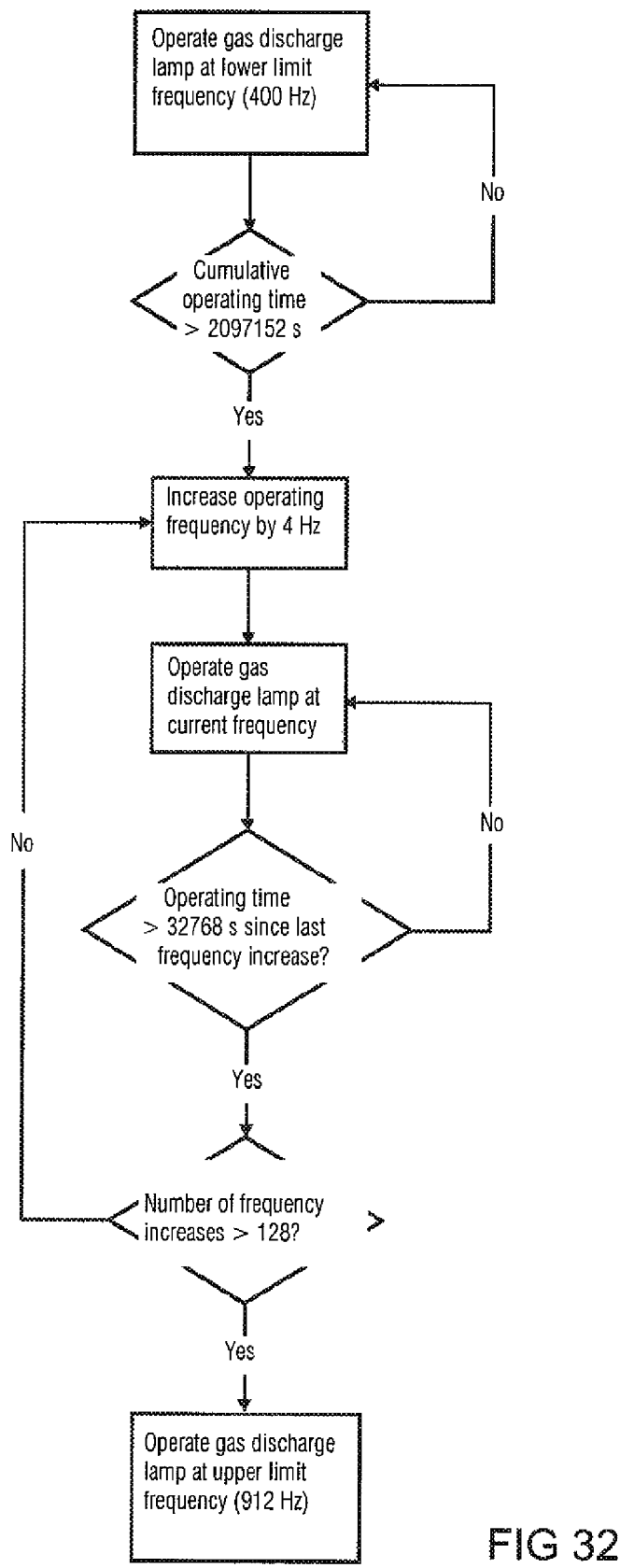
FIG. 32 shows a flow diagram of a variation of a first embodiment of a method for operating an integrated gas discharge lamp.

However, the frequency increase in the range 500 h to 1500 h does not need to occur continuously, but may also occur in steps. Thus, in a second variant of the first embodiment of the method, which is illustrated in FIG. 32, the frequency is always increased by 4 Hz once 32,768 s have elapsed, which corresponds approximately to 9.1 h, starting with a cumulative burning time of 2,097,152 s, which corresponds approximately to 583 h. The frequency is increased until it has been increased 128 times. Then, starting from the initial starting value of 400 Hz, the frequency has reached the value of 912 Hz. The second variant of the first embodiment of the method is particularly suitable for the implementation by means of digital logic, for example by means of a microcontroller or a digital circuit in an ASIC, since it only requires discrete time and frequency steps.

Figure 33:
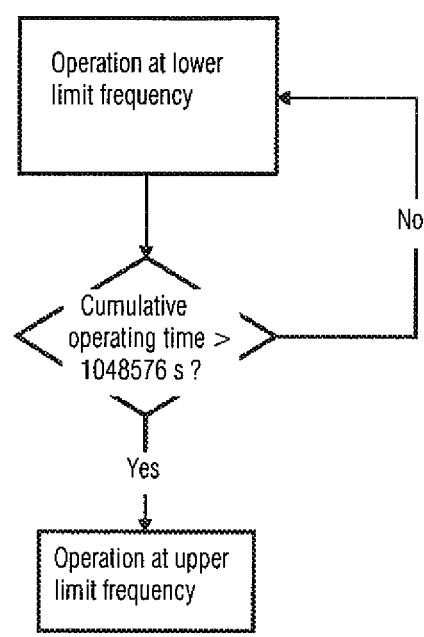
FIG. 33 shows a flow diagram of a further variation of the first embodiment of the method for operating an integrated gas discharge lamp.

In the third variant of the first embodiment, which is illustrated in FIG. 33, a particularly simple implementation is used. In this case, after a period of 1,048,576 s has elapsed, which corresponds to approximately 291 h, the frequency is doubled from 400 Hz to 800 Hz in a single step. Subsequently, the lamp is always operated with the high frequency. In contrast to the second variant of the first embodiment, however, only a single frequency step occurs.

Figure 34:
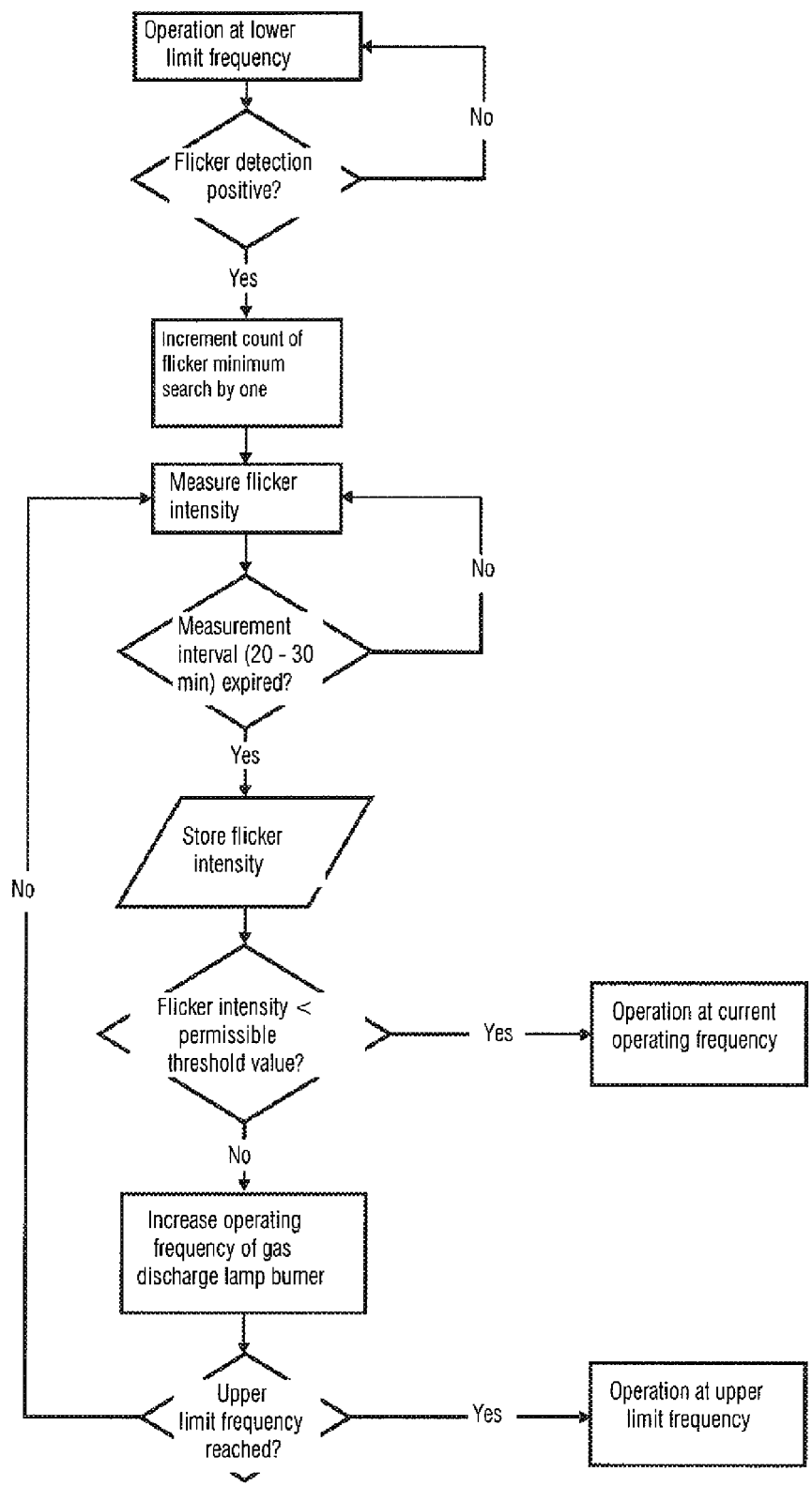
FIG. 34 shows a flow diagram of a second embodiment of a method for operating an integrated gas discharge lamp.

In a second embodiment, which is illustrated in FIG. 34, the above method is combined with a circuit arrangement for detecting jitter (not shown), in order to carry out an adaptation of the frequency, depending on need, to the requirements of the lamp burner. The circuit arrangement for detecting jitter is in this case based on a detection circuit which uses the lamp voltage and/or the lamp current for the detection process. As an alternative, suitably correlating parameters ahead of the converter may also be used for detection. An electronic operating device or ballast, as is normally used in the motor vehicle and can be contained in the integrated gas discharge lamp 5 as an operating electronics system 920, has a two-stage construction consisting of direct current converter and converter which are coupled to one another via an intermediate DC voltage link, wherein the change over time in the voltage of the intermediate DC voltage link and/or the change over time in the current flowing from the intermediate link into the converter may be considered as a measure for the jitter of the lamp.

The circuit arrangement for detecting jitter now detects whether a jitter occurs in the lamp. If this is the case, and if the previous burning time of the lamp is greater than 500 h, then a jitter mapping process is started.

The process includes the following steps:
  increasing the counter reading of a jitter minimum search by one
  step-wise increasing of the operating frequency of the gas discharge lamp burner starting from the lower threshold frequency,
  measuring the jitter intensity at the selected operating frequency.

In this case at least the jitter intensity at the selected operating frequency is stored in each case. If required, further parameters which are measured at the operating frequency are stored. The jitter intensity must be measured over a comparatively long period in order to compensate for statistical variations which may occur during operation. In the second embodiment a measuring time for example of 20-30 minutes is provided. The frequency is increased by 100 Hz each time in order to then measure the jitter intensity. In a first stage the frequency is increased up to a first upper threshold frequency of 900 Hz. As soon as the jitter disappears or the jitter intensity falls below a permissible threshold value, the increase in frequency is stopped and the current frequency is also secured for future operation in a non-volatile memory, such that when the integrated lamp is next switched on again, it will be started with the previously operated frequency.

If it was not possible to overcome the jitter despite an increase up to the first upper limit, or if it was not possible to reduce the jitter intensity below a permissible threshold value, then the counter reading of the jitter minimum search is increased by one and the frequency is further increased until triple the value of the first upper threshold frequency, in this case 2700 Hz, of the 'second upper threshold frequency' is reached. Then, the frequency is selectively chosen from the entire measured range between the lower threshold frequency and the second upper threshold frequency at which the least jitter has been shown. The jitter intensity associated with the least jitter is multiplied by a factor greater than 1 and is stored as a new permissible threshold value—the 'current jitter limit'.

The monitoring and measuring of the jitter subsequently remains activated and it is periodically examined whether the current jitter intensity is above the current jitter limit. If this is the case, it will be shifted to the frequency which has shown the second lowest jitter intensities in the examination of the lamp described above within the scope of this process. The lamp is then operated at this frequency, wherein the monitoring and measuring of the jitter also further continue to be activated. If the current jitter intensity is again above the current jitter limit, it will be changed to the frequency having the third lowest jitter intensity. If, in the subsequent operation, the current jitter intensity is also above the current jitter limit then the counter reading of the jitter minimum search will again be increased by one and a new cycle of the minimum search is started, wherein the entire frequency range between the lower threshold frequency and the second upper threshold frequency will be examined.

The counter reading, the frequency with which the jitter minimum search has already been activated, and the current jitter limit are stored in the non-volatile memory of the operating electronics system (920, 930). These two values can be read out via the communication interface of the integrated gas discharge lamp, for example via an LIN bus. Within the scope of servicing of the motor vehicle, for example within the scope of the inspection once a servicing interval has elapsed, or because the motor vehicle is in the repair shop due to a defect, the two values are read out and compared with limit values, which represent the values that are still to be tolerated. The limit values can also be stored in the integrated gas discharge lamp and read out via the communication bus, but, for reasons of simplicity, are stored in the diagnostic device of the repair shop in the preferred embodiment. If one of the values read out lies above the associated limit value, the integrated gas discharge lamp (5) is to be replaced by a new integrated gas discharge lamp. This procedure substantially increases the availability of the illumination system without generating significant costs, since the lamp is not replaced unnecessarily early and no significant additional time is required during the servicing since the vehicle is in any case connected to the diagnostic device.

The limit values with which the data from the non-volatile memory of the operating electronics system is compared may be altered depending on the cumulative burning time ($t_k$), which is also read out from the non-volatile memory, or the cumulative weighted burning time ($t_{kg}$), such that the jitter limit for example of an old lamp may be higher than that of a new lamp without the need to replace the lamp. The dependencies of the limit values dependent on the burning time of the lamp are provided by the lamp manufacturer to the vehicle manufacturer, so that he or she may input the data, for example in the form of a table or data matrix, into his or her diagnostic device.

In a third embodiment the process is carried out similarly to the second embodiment, however, in particular in order to save memory space in the microcontroller, only the value of the jitter intensity which has so far been minimal and the associated operating frequency are stored during the search described above. This means that instead of real mapping, only a minimum search with respect to the jitter intensity is carried out. Should there have been no interruption, as outlined above, to the search during the first search process up to the first upper threshold frequency, the search will also be continued up to the second upper threshold frequency, as in the second embodiment. Subsequently, a shift directly to the frequency stored in the minimum memory can be made. The lamp is then operated for at least 30 min at this frequency, and during this time the jitter intensity is determined over this period. If it is increased by more than a permissible factor, for example of 20%, compared to the initial intensity, a new search for the best possible operating frequency is started and carried out in the manner described above.

Due to the increase in the operating frequency of the gas discharge lamp burner over its burning time, a jitter tendency of the burner may be considerably reduced without the need for cost-intensive measures with regard to the circuit arrangement itself. Due to the fact that the operating electronics system of the integrated gas discharge lamp 5 includes a microcontroller, the entire process may be implemented in the software of the microcontroller and thus does not result in any additional costs. Also, the circuit arrangement for detecting jitter of the second embodiment may be implemented purely in software with a clever layout. Due to the fact that the variables to be measured required for the detection of jitter may already be applied to the microcontroller for other reasons, a detection unit may be implemented in the software by suitable evaluation of these variables. The circuit portions required in hardware are already present for other reasons and thus do not result in additional costs.

Communication Interface

As already outlined above, the integrated gas discharge lamp 5 may have communication means or at least one communication interface, which in particular enables communication with the on-board electronics of the motor vehicle. An LIN bus would appear to be particularly advantageous, but connection of the integrated gas discharge lamp by means of a CAN bus to the on-board electronics is also possible.

The lamp can advantageously communicate with the superordinate control system, for example a light module in a motor vehicle, via the communication interface. In this case a wide range of information regarding the integrated gas discharge lamp 5 can be transmitted to the superordinate control system via the communication interface. This information is stored in a non-volatile memory in the lamp. During manufacture of the integrated gas discharge lamp 5, a wide range of information accumulates which can be collected by the production plant and is programmed into the non-volatile memory of the lamp at the end of production of the lamp. However, the information can also be written directly into the non-volatile memory of the operating electronics system of the integrated gas discharge lamp 5, a communication interface thus not being absolutely necessary for this.

During production the gas discharge lamp burner 50 is, for example, precisely measured and, when capped on the base 70, is fixed in a precisely defined position on the base relative to a reference plane of the base. This ensures a high quality of the optical system formed of integrated gas discharge lamp and headlamp 3, since the arc burning between the gas discharge lamp electrodes 504 adopts an exact position relative to the reference plane, which represents the interface to the headlamp. The production equipment thus knows for example the distance and position of the electrodes. The distance between the electrodes may, however, represent an important variable for the operating electronics system, since the distance between the electrodes of the gas discharge lamp burner 50 correlates to the arc drop voltage. Furthermore, a unique serial number or alternatively a production batch number may be stored in the non-volatile memory of the lamp in order to ensure traceability. Using the serial number, the parts built into the integrated gas discharge lamp 5 together with all available data can be requested via a database maintained by the manufacturer in order to find individual parts of lamps affected by a manufacturing error.

In a preferred embodiment of the integrated gas discharge lamp 5, further parameters concerning the on-board electronics, which parameters are measured during lamp operation and are stored in the non-volatile memory of the integrated gas discharge lamp 5, can be requested and also stored to memory by means of the communication interface. By way of example, it may be expedient to store the data of the optical system, of which the headlamp consists, in the integrated gas discharge lamp 5, since it can thus control the power of the gas discharge lamp burner 50 such that a uniformly high light output of the headlamp system is achieved.

In particular the following communication parameters may be considered as communication parameters:
- the cumulative burning time of the gas discharge lamp burner 50,
- the number of jitter effects which occur, i.e. the number of times the permissible limit value is exceeded,
- the number of times the jitter minimum search is started,
- the current lamp power,
- the current frequency of the converter,
- the setpoint of the lamp power (=lamp target setpoint power),
- the actual value of the lamp power,
- the temperature of the electronics,
- the serial number or batch number,
- the total number of times the lamp goes out and the number of times the lamp goes out within a previous time period, for example 200 h,
- the number of times the lamp does not ignite.

In principle, a conventional operating electronics system which is not integrated in the lamp base of the discharge lamp could also have detected these parameters and could have provided them via a communication interface. However, these parameters would not have been usable for a diagnosis within the scope of the servicing of the vehicle, since the lamp could have been replaced at any time independently of the operating electronics system and the parameters read out thus would not necessarily have to describe the currently existing system formed of the lamp and operating electronics system.

This drawback is not posed by the described system of an integrated gas discharge lamp, in which a gas discharge lamp burner and an operating electronics system are inseparably integrated in a lamp.

The communication interface is preferably an LIN bus or alternatively a CAN bus. Both interface protocols are widely used and introduced within the automotive sector. If the integrated gas discharge lamp 5 is not used in a car, the communication interface of the integrated gas discharge lamp 5 may also include a protocol which is widespread within the field of general lighting, such as DALI or EIB/Instabus.

Based on this data (primarily of the cumulative burning time) the superordinate control system provided in the motor vehicle can calculate, for example, the anticipated moment of replacement of the integrated gas discharge lamp 5. On an inspection date of the motor vehicle it can then be decided as to whether the integrated gas discharge lamp 5 will continue to function correctly until the next inspection date, or whether it has to be replaced since a poor quality of light or even a failure of the lamp, for example, has to be suspected.

Due to the fact that the data can be read out via a communication interface of the integrated gas discharge lamp, a servicing technician may read out the data from the integrated gas discharge lamp and may replace the lamp as required before a failure, as has already been described above with respect to a jittering lamp.

If data from the production of the integrated gas discharge lamp is stored in an unchangeable manner in the non-volatile memory of the operating electronics system, the lamp may refer back to this data at any time in its service life calculations, with the result that the service life calculations, i.e. the estimation of the period over which the integrated gas discharge lamp will function correctly, will become substantially more accurate. Data is preferably stored in the non-volatile memory of the operating electronics system, from which the production time period can be derived. Any possible erroneous productions or defects which are only detected later within a batch can still thus be replaced in the field before the lamp fails. This is of great use to the user of the motor vehicle since it constitutes a particularly safety-relevant application, in particular with use of the integrated gas discharge lamp in a front headlamp. If data is stored in the non-volatile memory of the operating electronics system, as a result of which the integrated gas discharge lamp is identified uniquely, the data stored in a database during production can be easily and reliably associated with the lamp. This is particularly efficient if a distinct and unique serial number is stored in the non-volatile memory of the operating electronics system. The serial number also includes, inter alia, a manufacturer's code coordinated among all manufacturers, such that although different manufacturers of the same type of integrated gas discharge lamp can assign a consecutive number in their respective production process, it is still ensured that there will not be a second lamp with the same serial number.

During operation of the integrated gas discharge lamp, one or more numbers are preferably stored in the non-volatile memory, which increase monotonically with the burning time and/or the number of ignitions of the integrated gas discharge lamp. The burning time of the gas discharge lamp burner is detected, totaled and stored as cumulative burning time in the non-volatile memory of the operating electronics system. The cumulative burning time is preferably stored in the non-volatile memory in the form of a number. However, the burning time may also be weighted by operating parameters and may be stored as a number in the non-volatile memory of the operating electronics system, wherein this number then corresponds to the cumulative weighted burning time. The different types of cumulative burning time will be dealt with in greater detail further below. The previous burning time may thus be reliably matched with the service life specified by the manufacturer, and an accurate assertion regarding the remaining service life of the lamp may be made. The service life specified by the manufacturer may be a function of further data, also read out from the non-volatile memory, such that this may be dependent, for example, on the number of starts or the requested luminous flux of the lamp. The decision as to whether the integrated lamp has to be replaced may, for economic reasons, also be made based on the data stored in the diagnostic device of the servicing repair shop which have been determined within the scope of previous visits to the repair shop, and for example the information regarding how intensively the light had been used within the past servicing intervals may thus be taken into account in the decisions to be made.

If a number stored in the non-volatile memory of the operation electronics system makes an assertion about the jitter of the lamp, in particular the number of times the jitter minimum search has been started or the current jitter limit, the condition of the integrated gas discharge lamp may be detected accurately and read out as required. These values may be taken into account when servicing the vehicle in which the integrated gas discharge lamp is provided in order to evaluate the remaining service life. The number stored in the non-volatile memory of the operating electronics system regarding the number of ignitions of the gas discharge lamp burner may also be of interest to the servicing technician, since the number of the ignitions also affects the service life as well as the burning time. On a servicing date of the motor vehicle data is thus read out from the non-volatile memory of the operating electronics system and a different procedure is followed during the servicing process depending on the data. The servicing process is thus more efficient and improved, premature failures are rare and customer satisfaction is increased. The decision as to whether the integrated gas discharge lamp has to be replaced may be based, in addition to the experience of the servicing technician, on the data read out from the non-volatile memory of the operating electronics system. The decision to replace the integrated gas discharge lamp is preferably made when the cumulative burning time and/or the cumulative weighted burning time and/or the number of ignitions of the gas discharge lamp burner lies above a certain limit value. The limit value preferably depends on the production time period and/or on the data which allow unique identification of the integrated gas discharge lamp. A reliable and simple decision on the replacement of the integrated gas discharge lamp can thus be made.

Lumen Constancy

The information stored in the non-volatile memory of the integrated gas discharge lamp 5 may, however, also be used to keep the light output of the integrated gas discharge lamp 5 constant over the service life thereof. The light output at nominal power of gas discharge lamps changes over the service life thereof. With increasing burning time the efficiency of the lamp decreases due to blackening and devitrification of the discharge vessel, by burn-off of the electrodes and the change to the discharge arc caused thereby. The efficiency of the entire optical system is thus further decreased, since these systems are usually dimensioned for a spot light source or for the shortest discharge arc resulting from the minimum distance between electrodes, and more light is lost in the optical system with elongation of the discharge arc. The optical system itself also loses efficiency during its period of operation, either by lens opaqueness or by defocusing due to temperature cycles or the vibrations permanently occurring in a car headlamp. Reference will be made hereinafter to a lamp burning time $t_k$ and a cumulative weighted burning time $t_{kg}$, wherein the cumulative weighted burning time $t_{kg}$ is weighted with a weighting function $\gamma$ which will be discussed further below.

Figure 27:
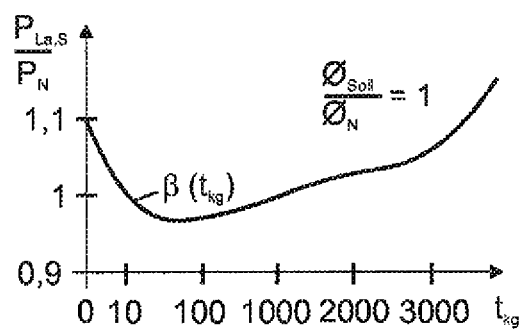
FIG. 27 shows a graph which illustrates the functional link between the normalized setpoint burning power and the cumulative weighted burning time of the gas discharge lamp burner.

Since the operating electronics system of the integrated gas discharge lamp 5 has stored the relevant parameters of the gas discharge lamp burner 50 in the non-volatile memory, it can adapt the operation power $P_{LA}$ applied to the gas discharge lamp burner 50 to the cumulative burning time. Since the aging process does not proceed in a linear manner, a compensation function $\beta$ is stored in the operating electronics system in a simple embodiment, as is shown in FIG. 27. In this case the cumulative weighted burning time $t_{kg}$ of the lamp is plotted over the quotient of the lamp power $P_{LA}$ to the nominal power $P_N$ of the gas discharge lamp burner 50. In the lower area below 10 h burning time the power is slightly increased. This helps to condition the gas discharge lamp burner 50. This is also known as "burning-in" of the gas discharge lamp burner 50 of the integrated gas discharge lamp 5. Once the lamp has been burnt in it is operated with slightly reduced power (approximately 90% of the nominal power), since the efficiency of the lamp as well as of the optics is still very good. The power increases again slowly from a cumulative weighted burning time $t_{kg}$ of approximately 100 h in order to reach a lamp power $P_{LA}$, which is approximately 10% higher than the specified nominal lamp burner lamp power, once the end of the specified service life of 3000 h has been reached. The light output of the gas discharge lamp burner is thus substantially constant over its burning time. The function stored in the operating electronics system can be influenced by burner parameters, such as the distance between the electrodes, stored in the non-volatile memory during production.

Figure 28:
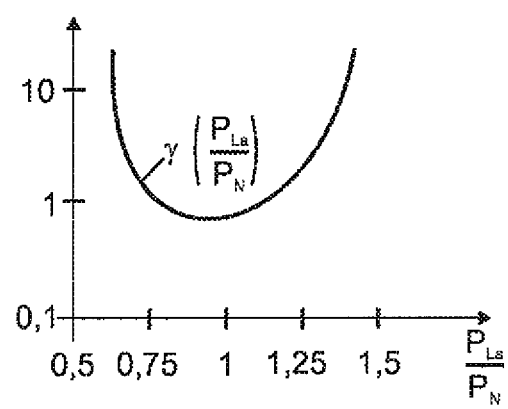
FIG. 28 shows a graphical representation of the weighting function γ.

In an advanced system having a control of the integrated gas discharge lamp 5 achieved by a superior control system, further light functions may be performed, such as speed-dependent control of the amount of light output. In such an advanced embodiment the operating electronics system is designed in such a way that it can operate the gas discharge lamp burner 50 with an underpower or an overpower. However, if the gas discharge lamp burner 50 is not operated at nominal power, it then ages differently compared to operation at nominal power. This has to be taken into consideration in the calculation of the cumulative burning time. For this purpose a weighting function $\gamma$ is stored in the operating electronics system, which represents a factor dependent on the underpower or overpower. FIG. 28 shows the weighting function $\gamma$ for an integrated gas discharge lamp 5 designed for use in the front headlamp of a motor vehicle. If the gas discharge lamp burner is operated with overpower, it ages faster since the electrodes are too hot and electrode material is evaporated. If the gas discharge lamp burner 50 is operated with considerable underpower, it likewise ages faster since the electrodes are too cold and electrode material is thus sputtered off, whereby electrode material is removed by sputtering, which is undesirable since this reduces the service life of the lamp and the light yield. Therefore, the operating electronics system of the integrated gas discharge lamp 5 has to factor this aging into the cumulative weighted burning time $t_{kg}$. For example, this may be achieved by the following formula:

$$t_{kg}(t) = \int_{0h}^{t} f(\tau) \cdot \gamma\left(\frac{P_{LA}(\tau)}{P_N}\right) d\tau;$$

the function $f(\tau)$ merely representing the burning function, i.e. as soon as the gas discharge lamp burner 50 is set in operation, $f(\tau)=1$, and when the gas discharge lamp burner 50 is not operated $f(\tau)=0$. Accordingly, if the integrated gas discharge lamp 5 is operated at underpower or overpower, it ages faster by a factor which may reach the value of ten.

Figure 29:
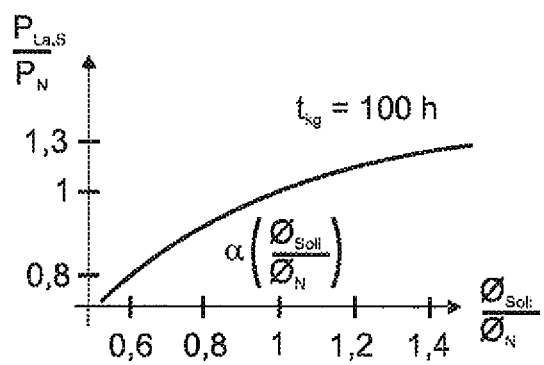
FIG. 29 shows a graphical representation of the function α.

In an advanced control system, which can operate the gas discharge lamp burner 50 at underpower or overpower, it is also possible to implement an advanced communication with the superior control device. This may be provided such that the superior control device no longer requests a specific power from the integrated gas discharge lamp 5, but instead requests a predetermined amount of light. In order to achieve this, a dim curve is stored in the operating electronics system of the integrated gas discharge lamp 5. FIG. 29 shows such a dim curve $\alpha$ using the example of an integrated gas discharge lamp 5 for automotive engineering. The dim curve shows the dependency of the luminous flux $\Phi_{Soll}$ output from the gas discharge lamp burner 50, or, as shown in FIG. 29, the luminous flux $$\frac{\phi_{Soll}}{\phi_N}$$

normalized to the nominal luminous flux $\phi_N$ on the electrical burner power $P_{LA,S}$ or, as shown in FIG. 29, the electric burner power $$\frac{P_{La,S}}{P_N}$$

normalized to the electric normal nominal burner power $P_N$. In FIG. 29 this is plotted with a cumulative weighted burning time $t_{kg}$ of the gas discharge lamp burner 50 of 100 h. Other curves will be produced for another cumulative weighted burning time $t_{kg}$ of the gas discharge lamp burner 50. In the ideal case a three-dimensional mapping is thus stored in the operating electronics system of the integrated gas discharge lamp 5, which takes into consideration the age of the gas discharge lamp burner 50. FIG. 29 is thus merely a section through the mapping for a cumulative weighted burning time $t_{kg}$ of the gas discharge lamp burner of 100 h. The mapping for determining the lamp power may include further dimensions in addition to the luminous flux and the cumulative weighted burning time, such as the burning time since the last ignition of the lamp or the estimated burner temperature in order to image, in particular, effects in the range up to few minutes after ignition, which effects are caused by thermal transients during the 'start-up' of the lamp, wherein the filling vaporizes inter alia. The dim curve does not necessarily have to be stored in the operating electronics system of the integrated gas discharge lamp 5 as mapping, but can also be stored as a function such that it can be calculated by a microcontroller integrated in the operating electronics system. In order to be able to implement as easily as possible the calculation of the lamp power which is to be set, the underlying function or the corresponding mapping may be expressed approximately by a product, wherein as factors in addition to the nominal power $P_N$ of the gas discharge lamp burner, each individual factor describes the influence of the above-mentioned variables. The required burner power $P_{La}$ for a determined amount of light can thus be expressed, for example, by the following formula:

$$P_{La} = P_N \cdot \alpha\left(\frac{\phi_{Soll}}{\phi_N}\right) \cdot \beta(t_{kg});$$

the factor $\beta$ taking into consideration the aging of the gas discharge lamp burner 50. The function $\beta$ may also include the aging of the optical system, wherein this data is preferably communicated via the communication interface of the integrated gas discharge lamp such that these influences can also be taken into consideration in the calculation of the operating electronics system of the integrated gas discharge lamp. The amount of light predetermined by the control device may be dependent on the speed of a motor vehicle in which the integrated gas discharge lamp 5 is operated. At slow speed, for example, the lamp is operated in a dimmed manner, whereas at high speed, such as on a high-speed road, it is operated slightly above nominal power in order to ensure a broad view and good illumination of the road.

Figure 30:
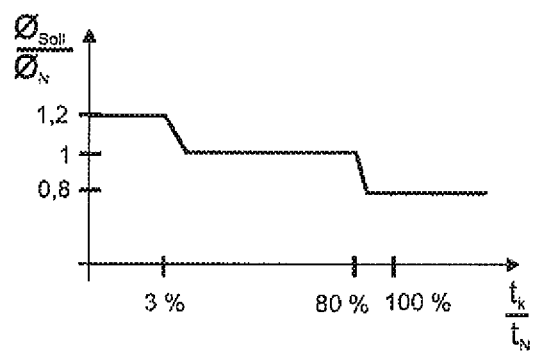
FIG. 30 shows a graphical representation of the normalized setpoint luminous flux as a function of the normalized cumulative burning time of the gas discharge lamp burner.

In an advanced operating electronics system of a further embodiment of the integrated gas discharge lamp 5, the previous burning time of the gas discharge lamp burner 50 during operation can also or additionally be taken into consideration. When the cumulative weighted burning time $t_{kg}$ approaches the end of the specified service life of the gas discharge lamp burner, the operating electronics system can operate the burner at a power which lets it age at the slowest rate and thus increases its service life effectively compared to usual operation. FIG. 30 shows such an exemplary burner preserving curve, in which the luminous flux quotient $$\frac{\phi_{Soll}}{\phi_N}$$

is plotted over the cumulated normalized service life $$\frac{t_k}{t_N}.$$

The latter is calculated from the lamp burning time $t_k$ divided by the nominal service life $t_N$ of the lamp of, for example, 3000 hours. The gas discharge lamp burner 50 is operated at 1.2 times its nominal power for up to 3% of its nominal service life in order to condition and burn-in the gas discharge lamp burner 50. Thereafter, the gas discharge lamp burner 50 is operated at nominal power for a specific amount of time. When the gas discharge lamp burner 50 reaches 80% of its service life the power is successively reduced to approximately 0.8 times the nominal power. Upon closer inspection, the weight function in FIG. 28 reveals that the lamp is mostly preserved when operated at approximately 0.8 times its nominal power. Therefore, the integrated gas discharge lamp 5 will be operated at this power when approaching the end of its service life in order to ensure that the remaining service life is as long as possible and to avoid a sudden lamp failure, which would be fatal in the automotive field in particular. Instead of the lamp burning time $t_k$, the cumulative weighted burning time $t_{kg}$ may also be used in contrast to the illustration shown in FIG. 30.

Based on the above-mentioned data and calculations, the integrated gas discharge lamp 5 can calculate the expected remaining service life of its gas discharge lamp burner, and can store this information in a non-volatile memory of the operating electronics system 220, 230. Hence, if the motor vehicle is in the repair shop for inspection, lamp data of interest for the inspection, in particular the stored remaining service life, may be read out. Based on the remaining service life read out, it may then be decided whether the integrated gas discharge lamp 5 is to be replaced. It is also conceivable that the serial number of the integrated gas discharge lamp and/or the serial number of the gas discharge lamp burner 50 are stored in the integrated gas discharge lamp 5. Based on the serial number the mechanic in the repair shop can request via a manufacturer's database whether the lamp is sound or has to be replaced, for example owing to shortcomings in the manufacturing process or because of failures of components incorporated therein.

In a further advantageous embodiment of the integrated gas discharge lamp 5 and in contrast to the previously described embodiment, the expected remaining service life will not be read out in the repair shop, but instead the data relating to how the lamp has been actually operated will be read out. This data will then be evaluated by a diagnostic device on the basis of the nominal data, assigned to the respective serial number, from the manufacturer's database. For example, the nominal service life $t_N$ of a lamp having a given serial number is thus deposited in the manufacturer's database. This would be correspondingly low in the case of product defects. Since further data regarding operation, such as the number of ignitions, will also be stored in the operating electronics system these parameters may also be compared to the manufacturer's database, which includes for example the number of nominal ignitions for each lamp. A high number of ignitions read out from the operating electronics system, which number approaches the nominal ignitions, thus leads to the decision that the lamp is to be replaced, although for example the nominal service life of the lamp has not yet been reached. By using such criteria the availability of the light source is increased economically. This approach is therefore to be seen as being particularly economical since a lamp is only replaced if the likelihood of its imminent breakdown is high. The manufacturer of the lamp is encoded in the first bit of the serial number of the lamp such that it is ensured that the serial number remains unique, although a number of lamp manufacturers may possibly produce interchangeable products.

When requesting nominal data such as the nominal service life or the nominal ignitions from the manufacturer's database via a communications connection between the repair shop and the lamp manufacturer, for example via an Internet connection, the data regarding the operation read out from the operating electronics system is in return transmitted to the lamp manufacturer. Accordingly, a bi-directional data exchange occurs between the operating electronics system of the lamp and the manufacturer's database. On the one hand, this allows the tracking of products in the field, in particular allows statistical analysis regarding the sort of use of the product, which is highly advantageous in particular for further product development, however individual data analysis is also possible if, for example, the VIN (vehicle identification number) of the vehicle is transmitted in addition to the serial number. Furthermore, the possibility of protection against product counterfeiting is also provided. The latter is achieved in that, in the event of product counterfeiting, the serial number also has to be copied, which, when transmitting the data to the manufacturer, ultimately leads to an apparent inconsistency of the data since, for example, the operation hours which are assigned to a serial number cannot decrease again, which allows a corresponding conclusion to be made that counterfeited products are involved.

Arc Straightening

A method for straightening the discharge arc of the gas discharge lamp burner will be described hereinafter and is implemented in an embodiment of the integrated gas discharge lamp 5. A first embodiment is based on an operating electronics system 920 which has a topology according to FIG. 23. The operating electronics system 920 includes a DC voltage converter 9210 which is powered by the battery voltage of a car. A converter 9220 is connected downstream of the DC voltage converter 9210 via an inter-circuit capacitor $C_{ZW}$, which converter supplies AC voltage to a gas discharge lamp burner 50 via a lamp circuit. The lamp circuit consists of an output capacitor $C_A$ and the ignition electronics system 910, with the primary winding of the ignition transformer in the lamp circuit, as well as of the gas discharge lamp burner 50. By means of this topology, which is commonly known from the prior art, the discharge arc can be straightened with a clever design of the components.

A straightened discharge arc offers many advantages. A first significant advantage is the improved thermal balance of the gas discharge lamp burner 50, which is obtained by a more uniform thermal wall stressing of the burner vessel. This leads to improved thermal utilization and thus to an increased service life of the burner vessel. A second significant advantage is provided by the contracted arc, which exhibits reduced diffusivity. With such a 'narrower' arc, the optics of a headlamp for example can be more precise and the light yield of the headlamp can be increased significantly.

Since the ignition and operating electronics systems 910, 920 or the overall operating electronics system 930 (also referred to hereinafter as the operating electronics) in the integrated gas discharge lamp 5 is/are inseparably connected to the gas discharge lamp burner 50, the operating electronics can calibrate to the gas discharge burner 50 in order to generate a straight arc which burns in a stable manner. Since, due to the inseparability of the operating electronics system 920, 930 and the gas discharge lamp burner 50 of the operating electronics system, the burning time of the gas discharge lamp burner 50 is also known, aging effects of the gas discharge lamp burner 50 can influence the mode of operation of the gas discharge lamp burner 50.

The basic approach for straightening the arc of the integrated gas discharge lamp 5 is as follows: the operating electronics system 920, 930 measures the gas discharge lamp burner 50 with regard to acoustic resonances when firstly switched on and detects the frequencies suitable for arc straightening. This is carried out by means of scanning through the frequency ranges between a minimum frequency and a maximum frequency. The frequencies are modulated onto the operating frequency of the integrated gas discharge lamp burner. During this scanning process the impedance of the gas discharge lamp burner is measured and in each case the lowest impedance with the corresponding frequency is stored. This frequency with the lowest impedance characterizes the maximum arc straightening achievable. Depending on the lamp type the minimum frequency may be as low as a frequency of 80 kHz, and the maximum frequency may reach a frequency of about 300 kHz. In a typical high-pressure discharge lamp for the automotive industry the minimum frequency is approximately 110 kHz and the maximum frequency is approximately 160 kHz. The measuring process is required for compensation of manufacturing tolerances of the gas discharge lamp burner 50. The typical aging in terms of the resonance frequencies of the lamp is stored in a microcontroller (not shown) of the operating electronics system 920, 930, for example in a table. The values in the table may optionally be stored depending on the kind of operation of the gas discharge lamp burner (cycle shape, start-up or dimmed operation). In addition, in a further embodiment the controlled operation may be extended by a controlled modulation operation with a modulation frequency within a narrow range around the calculated frequency (in accordance with controlled operation). The calculated frequency is modulated with a modulation frequency of, for example, 1 kHz in order to prevent possible jitter by stimulation of acoustic resonances in the gas discharge lamp burner 50. One advantage over previous operation devices according to the prior art is that now the frequency range (within which the frequency may be varied) is very small, and the problems regarding extinguished lamps or unstable controller behavior are reduced. Nevertheless, it may be expedient for some types of lamp to measure the frequency ranges around the actual modulation frequency in terms of their jittering behavior in order to ensure stable lamp operation. For this purpose the circuit arrangement for detecting jitter is used in a first embodiment and frequencies close to the modulation frequency are measured with regard to their jittering behavior.

Figure 23:
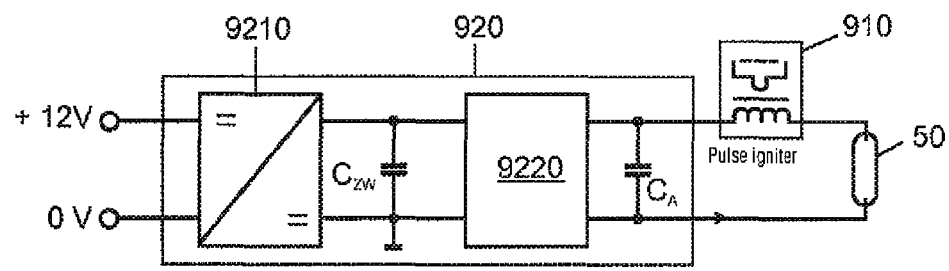
FIG. 23 shows a first embodiment of a circuit topology for a mode of operation with straightened discharge arc.

In a first embodiment according to FIG. 23 the frequency of the DC voltage converter 9210 is selected to be equal to the modulation frequency. Owing to a corresponding design of the inter-circuit capacitor $C_{ZW}$, a high frequency ripple remains as high-frequency AC voltage modulated on the DC voltage output by the DC voltage converter 9210. The DC voltage with the high-frequency AC voltage modulated thereon serves as input voltage for the converter 9220. In this case the converter 9220 is provided as a full bridge which converts the DC voltage into a rectangular AC voltage. The amplitude of the modulation signal, i.e. of the high-frequency modulated AC voltage, is determined by the dimensioning of the output filter of the full bridge (output capacitor $C_A$) as well as by the inductivity of the secondary winding (IPSH, IPSR) of the pulse ignition transformer. Owing to the fact that in the case of the integrated gas discharge lamp 5 these components are inseparably connected to one another, it is possible to effectively adjust the components to the desired mode of operation. The desired straightening of the discharge arc occurs owing to the superimposed high-frequency voltage. The drawback of this embodiment is the fixed-frequency mode of operation of the DC voltage converter, which does not allow an effective switching relief such that the losses of the system increase.

Figure 24:
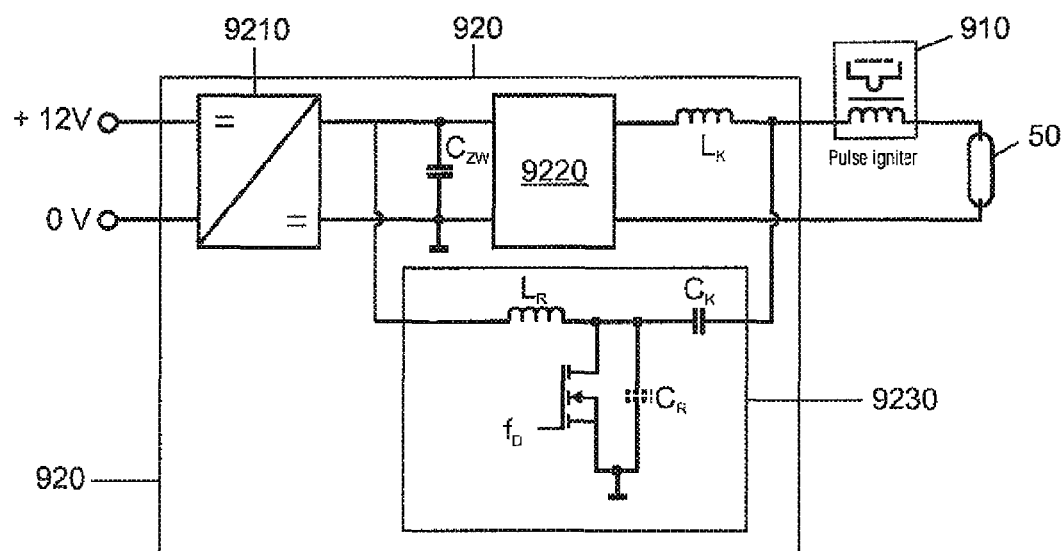
FIG. 24 shows a second embodiment of a circuit topology for a mode of operation with straightened discharge arc.

In a second embodiment according to FIG. 24 the superimposed high-frequency voltage is generated by a signal generator 9230. This couples in the high-frequency voltage in the lamp circuit between a choke coil $L_K$ and the primary winding of the ignition transformer of the ignition electronics system 910. The coupling-in upstream of the ignition transformer is important since the signal generator 9230 otherwise would have to be designed in a high-voltage-stable manner. The choke coil decouples the inter-circuit capacitor $C_{ZK}$, since it otherwise would dampen the coupled-in high-frequency voltage to excess. For this reason, the inductivity of the ignition transformer of the ignition electronics 910 should also be as small as possible. In this respect the signal generator may be designed such that the frequency of the coupled-in high-frequency voltage is in turn modulated in order to achieve a more reliable and jitter-free operation of the gas discharge lamp burner 50.

Figure 25:
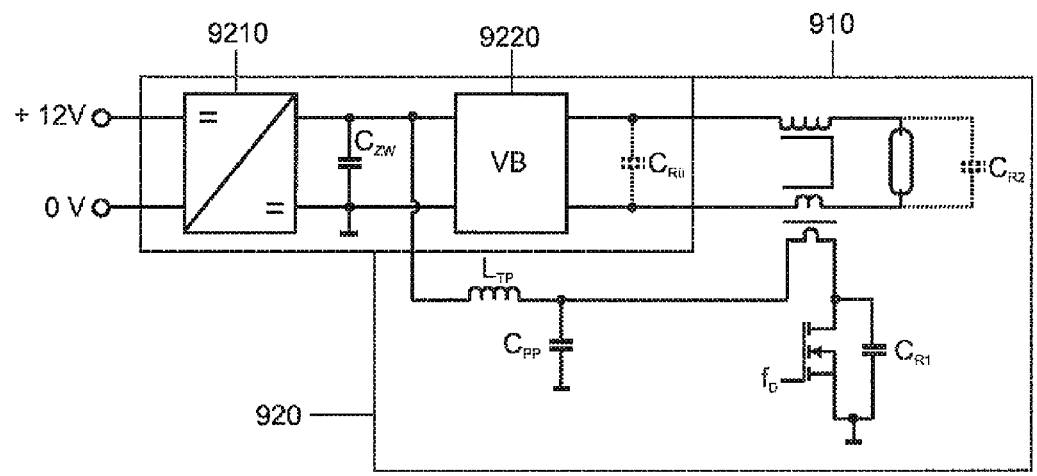
FIG. 25 shows a third embodiment of a circuit topology for a mode of operation with straightened discharge arc.

In a third embodiment which is shown in FIG. 25 the signal generator is integrated in the ignition electronics 910. In this case, the gas discharge lamp burner 50 is started by resonance ignition. The ignition electronics system comprises an ignition transformer $T_{IR}$ which is designed for high-frequency operation and is controlled by a signal generator which is designed as a class E converter. The ignition transformer $T_{IR}$ is to be dimensioned such that it can still transmit at least the fundamental oscillation of the prevailing high-frequency, which is identical to the switching frequency of the class E converter, to a sufficient extent, in particular such that its efficiency at this frequency is greater than 10%. The switching frequency of the class E converter during the ignition process has a value between 80 kHz and 10 MHz. However, the frequency is preferably selected to be above 300 kHz, since this allows a small design, and below 4 MHz since in this case the achievable efficiencies are particularly high. The ignition transformer is controlled via a galvanically separated primary winding. The secondary winding is divided into two galvanically separated coils, which are respectively connected between a lamp electrode and the converter 9220. In this case the signal generator generates a high-frequency current through the primary winding of the ignition transformer $T_{IR}$, which excites a resonance in a resonance circuit on the secondary side, which allows the gas discharge lamp burner 50 to break through. The resonance circuit consists of the secondary inductivity of the ignition transformer $T_{IR}$ and a capacity $C_{R2}$ arranged over the lamp. Since the capacity $C_{R2}$ is very small, it does not necessarily have to be integrated as a component in the ignition electronics 910, but may be produced as a result of design measures.

As soon as the gas discharge lamp burner 50 has ignited, the mode of operation of the signal generator will be changed such that it merely couples in a high-frequency signal via the ignition transformer $T_{IR}$, which signal is modulated onto the lamp voltage for arc straightening. This provides the advantage that the frequency and the amplitude of the modulated voltage are relatively freely adjustable without the need to dispense with an optimized mode of operation of the DC voltage converter 9210 or of the converter 9220. Owing to this circuit topology, the ignition electronics system 910 may also provide an increased takeover voltage, generated via the resonance circuit, for the gas discharge lamp burner 50 in such a way that it does not have to be generated by the DC voltage converter 9210. As a result of this measure, the mode of operation of the DC voltage converter 9210 can be further optimized since the required output voltage range of the DC voltage converter 9210 becomes smaller. In addition, the converter 9220 has to convert less power, since some of the lamp power is coupled-in via the modulated lamp voltage. This embodiment thus offers the greatest degree of freedom in implementation of the operating parameters, such that it is possible to achieve an optimized and reliable operation of the gas discharge lamp burner 50 with a straightened discharge arc.

Figure 26:
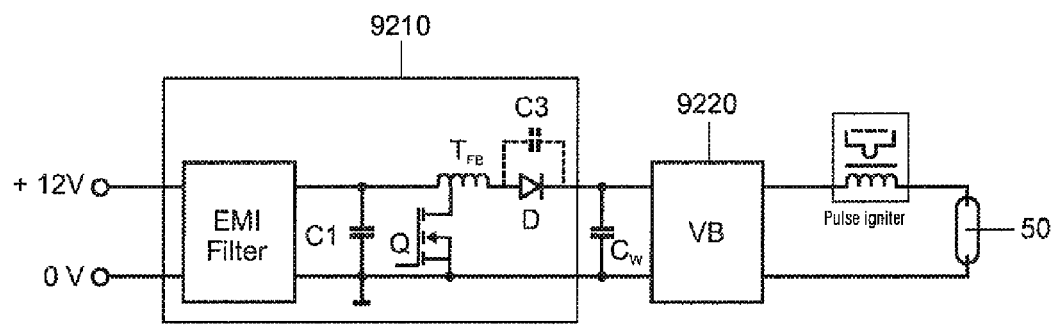
FIG. 26 shows a circuit topology for a simplified mode of operation of a DC voltage converter.

FIG. 26 shows an embodiment, which is simplified compared to the prior art, of a DC voltage converter 9210. The DC voltage converters for ballast devices which are conventional in the prior art and are operable in an on-board supply system include a B.O.-type converter topography, which is also referred to as Flyback since the on-board voltage has to be increased from 12 V to a higher voltage. Due to the fact that in the case of the integrated gas discharge lamp 5 the electrical contacting only occurs upon insertion of the lamp into the headlamp 3, a simplified converter in the form of a step-up actuator, which is also referred to as s boost-converter, comprising an autotransformer $T_{FB}$ may also be used. This is possible since, in the case of the used electromagnetic interface, an accidental contacting of the converter output with the vehicle ground, which would result in destruction of the boost-converter, can be excluded. The DC voltage converters used previously in the prior art with B.O.-type converter topology make it possible to interrupt the energy flux in spite of a short circuit on the output side. This is not the case in the present converter design according to FIG. 26 since, in this case, there is no galvanic separation over the power path of the converter, which could interrupt the energy flux from the input, i.e. the 12 V on-board supply system, to the output, i.e. to the power supply of the gas discharge lamp burner 50 which was accidentally connected to the vehicle ground. The DC voltage converter is otherwise designed in the conventional manner. It consists of an input-side EMI filter, an input capacitor C1, a converter switch Q, and an inductor $T_{FB}$ designed as an autotransformer which acts on the inter-circuit capacitor $C_{ZW}$ via a diode D. This converter is much more cost-effective compared to the B.O.-type converters used in the prior art, whereby the integrated gas discharge lamp 5, when viewing the system as a whole, is significantly more cost-effective compared to a lamp system of the prior art having a gas discharge lamp and an external electronic operating device.

LIST OF REFERENCE NUMERALS

20 electronic operating device
210 electrical contact
220 electrical contact
230 electrical contact
240 electrical contact
3 headlamp
33 headlamp reflector
35 carrier part with counter-contacts
350 counter-contacts
351, 352 slits
5 integrated gas discharge lamp
50 gas discharge lamp burner
502 discharge vessel
504 electrodes
506 molybdenum film
52 metal clip for retaining the gas discharge lamp burner
53 retaining plate for metal clip
54 metal coating for outer bulb
56 power supply of the gas discharge lamp burner close to the base
57 power supply remote from the base
70 lamp base
702 reference ring
703 protrusions protruding from the reference ring
705 retaining clip for gas discharge lamp
7051 groove into which the retaining clip hooks
7053 bulge in the retaining clip
71 ring seal of the reflector
72 electrically conductive housing
722 tabs
73 ring seal between the base plate and the base
74 base plate
741 base plate dome
80 ignition transformer
81 ferrite core
811 first ferrite core half
8110 first half of the inner part of the ferrite core
8112 side wall of the first ferrite core half
81121 elongated recesses
812 second ferrite core half
814-816 return ferrite
8120 second half of the inner part of the ferrite core
8122 side wall of the second ferrite core half 81221 elongated recesses
821 hollow cylinder
822 round plates
823 slit
824 hollow cylindrical central core
825 first plate
826 second plate
827 shoulder
85 contact body
851 first roof face
852 second roof face
86 primary winding
861, 863, 865 cylindrical inwardly pointing rounded portions
862, 864 tabs for electrical contact
8620, 8640 radii or rounded portions at the ends of the sheet metal strip of the primary winding
866-869 fixing tabs for mechanical fixing secondary winding
871 inner end of the secondary winding
872 outer end of the secondary winding
910 ignition electronics system
920 operating electronics system
930 overall operating electronics system
9210 DC voltage converter
9220 converter
9230 signal generator

The invention claimed is:

1. An ignition transformer for generating an ignition voltage for a high-pressure gas discharge lamp which has a high-pressure gas discharge lamp burner, comprising a ferrite core and at least one primary winding and at least one secondary winding, the at least one secondary winding being formed from an insulated metal strip that is disposed on the ferrite core in such a way that the end of the at least one secondary winding that carries the high-voltage is disposed on the inside of the ferrite core, wherein the ferrite core has the form of a film reel, and the secondary winding is wound onto the ferrite core like a film.

2. The ignition transformer as claimed in claim 1, wherein the ferrite core comprises two essentially parallel side walls and a central core, the outer contour of the side walls being round or essentially square.

3. The ignition transformer as claimed in claim 2, wherein the side walls of the ignition transformer comprise elongated recesses extending from the outside in on the side facing the winding in order to improve the soaking or casting process.

4. The ignition transformer as claimed in claim 1, wherein the ferrite core consists of two ferrite core halves which, when assembled, adopt the form of a film reel, the central core of the ferrite core being hollow cylindrical and consisting of two halves, and each ferrite core half having a side wall and a central core half.

5. The ignition transformer as claimed in claim 4, wherein the ignition transformer comprises a contract body which is disposed within the hollow cylindrical region of the ferrite core, the start of the metal strip of the secondary winding is guided inwardly between the two core halves or through the slit in the hollow cylindrical third part, where it can then be electrically connected to the contact body, and the contact body is in turn electrically connectable to a power supply of the high-pressure discharge lamp burner.

6. The ignition transformer as claimed in claim 4, wherein the ratio of diameter to height of the ferrite core is greater than 1 and less than 9.

7. The ignition transfer as claimed in claim 5, wherein the contact body consists of a curved sheet metal part, the curved sheet metal part consisting of an essentially rectangular face, which is curved together in a cylindrical manner, and two laterally protruding tabs which are mutually opposed in the curved state and are inclined to one another in the manner of two roof faces, an at the end at which the two roof faces meet are shaped in such a away that a power supply wire of the high-pressure discharge lamp electrode is clamped in a centered manner.

8. The ignition transformer as claimed in claim 1, wherein the ferrite core has three parts which, when laid centrally one above the other, adopt the form of a film reel, two of the three parts being essentially identical and forming two side walls forming the film reel, and the third part having a hollow cylindrical form which forms the central core of the film reel, the hollow cylindrical third part comprising a slit in the longitudinal direction.

9. The ignition transfer as claimed in claim 1, wherein the ignition transformer comprises a primary winding with at least one turn which is designed as a strip-like, resilient, stamped bent part in such a way that the secondary winding is secured by the resilience of the primary winding, and the outer end of the secondary winding is electrically connected to the primary winding.

10. The ignition transformer as claimed in claim 9, wherein the stamped bent part of the primary winding is round or angular and in the case of the angular shaping it comprises at the corners of the stamped bent part cylindrical, inwardly pointing rounded portions in which yoke ferrites, are fixed.

11. The ignition transformer as claimed in claim 10, wherein the stamped bent part of the primary winding comprises at least two spiraled windings arranged one on top of the other.

12. The ignition transformer as claimed in claim 9, wherein the stamped bent part of the primary winding comprises laterally integrally molded first tabs which mechanically fasten the ignition transformer.

13. The ignition transformer as claimed in claim 9, wherein the stamped bent part of the primary winding has outwardly pointing rounded portions at either end for relieving the mechanical load of second tabs which are laterally integrally molded on the respective end and in turn electrically contact an ignition electronics system.

14. The ignition transformer as claimed in claim 1, wherein the ignition transformer is soaked with a suitable means or cast with a casting compound in order to increase the mechanical stability and the strength of electrical insulation.

15. The ignition transformer as claimed in claim 1, wherein the ignition transformer has a height of 5 mm-10 mm and a diameter of 15 mm-35 mm.

16. An integrated gas discharge lamp comprising an ignition transformer as claimed in claim 1.

17. The ignition transformer as claimed in claim 1, wherein the ignition transformer is soaked with impregnating varnish, or cast with a casting compound in order to increase the mechanical stability and the strength of electrical insulation.

18. The ignition transformer as claimed in claim 4, wherein the ratio of diameter to height of the ferrite core greater than 1.5 or less than 5.

19. The ignition transformer as claimed in the ignition transformer a height of 8 mm and a diameter of 26 mm.

* * * * *